US005788014A

United States Patent [19]
Saint et al.

[11] Patent Number: 5,788,014
[45] Date of Patent: Aug. 4, 1998

[54] MOTOR MECHANISM FOR CHILD'S SWING

[75] Inventors: David Saint; James A. Sack, both of Elverson, Pa.

[73] Assignee: Graco Children's Products Inc., Elverson, Pa.

[21] Appl. No.: 556,603

[22] Filed: Nov. 13, 1995

[51] Int. Cl.[6] .................................................. F03G 1/00
[52] U.S. Cl. .......................... 185/43; 192/56.2; 464/40; 74/543; 74/545; 74/557
[58] Field of Search ..................... 185/43, 39, 37; 192/56.1, 56.2; 464/40; 472/119; 74/543, 545, 557

[56] References Cited

U.S. PATENT DOCUMENTS

| 2,341,332 | 2/1944 | Pudelko | 185/43 |
|---|---|---|---|
| 2,637,987 | 5/1953 | Hill | 185/43 |
| 2,979,734 | 4/1961 | Saint | 472/119 |
| 3,450,365 | 6/1969 | Kaplan | 464/40 |
| 3,804,407 | 4/1974 | Saint | 472/119 |
| 3,893,554 | 7/1975 | Wason | 192/56.2 |
| 4,323,233 | 4/1982 | Gebhard | 472/119 |
| 5,083,773 | 1/1992 | Saint | 472/119 |

FOREIGN PATENT DOCUMENTS

| 4-272515 | 9/1992 | Japan | 464/40 |
|---|---|---|---|

Primary Examiner—Khoi Q. Ta
Assistant Examiner—David M. Fenstermacher
Attorney, Agent, or Firm—Richard B. O'Planick

[57] ABSTRACT

A spring motor mechanism for use with a child's swing that includes a spring attached to a slip clutch device to prevent the spring from becoming over wound. In addition, the spring motor mechanism includes an indicator for revealing, based upon the amount of torque stored in the spring, the remaining number of child seat oscillations that can occur before the spring must be re-wound, and an adjustable swing height portion to prevent the over-swinging of the child seat.

19 Claims, 23 Drawing Sheets

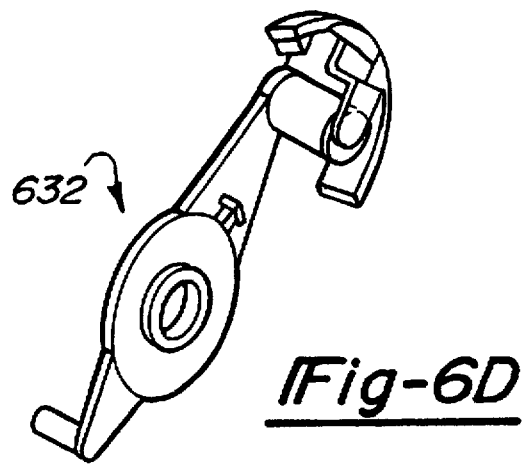
_Fig-6D_
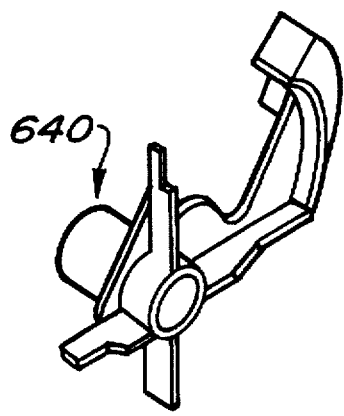
_Fig-6E_
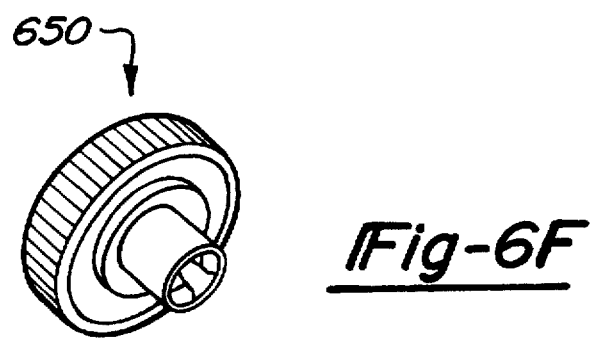
_Fig-6F_

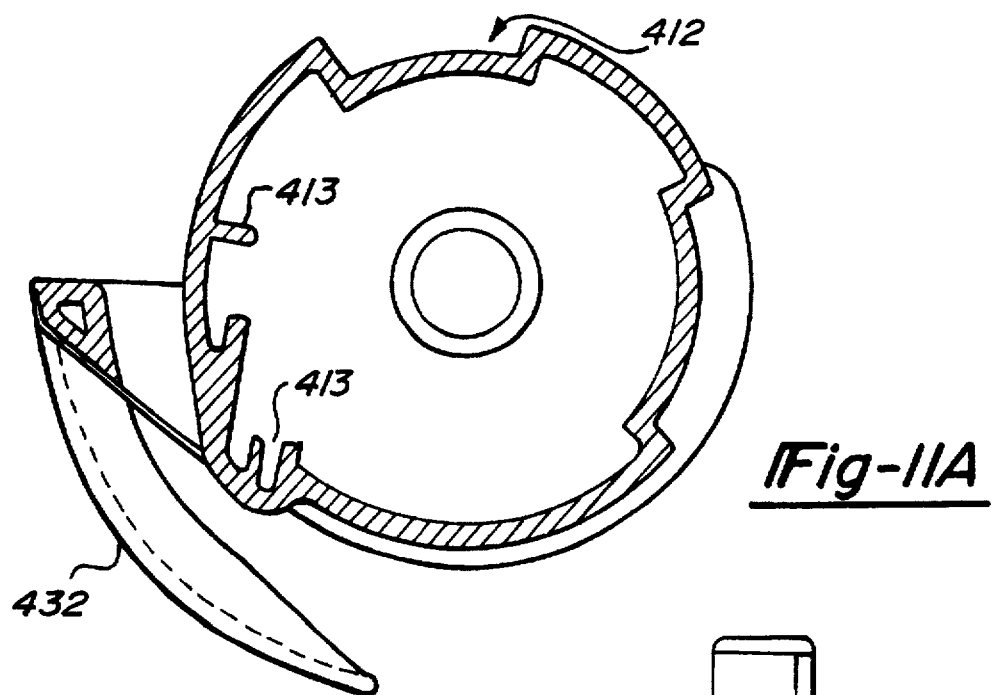
*Fig-11A*
*Fig-11B*
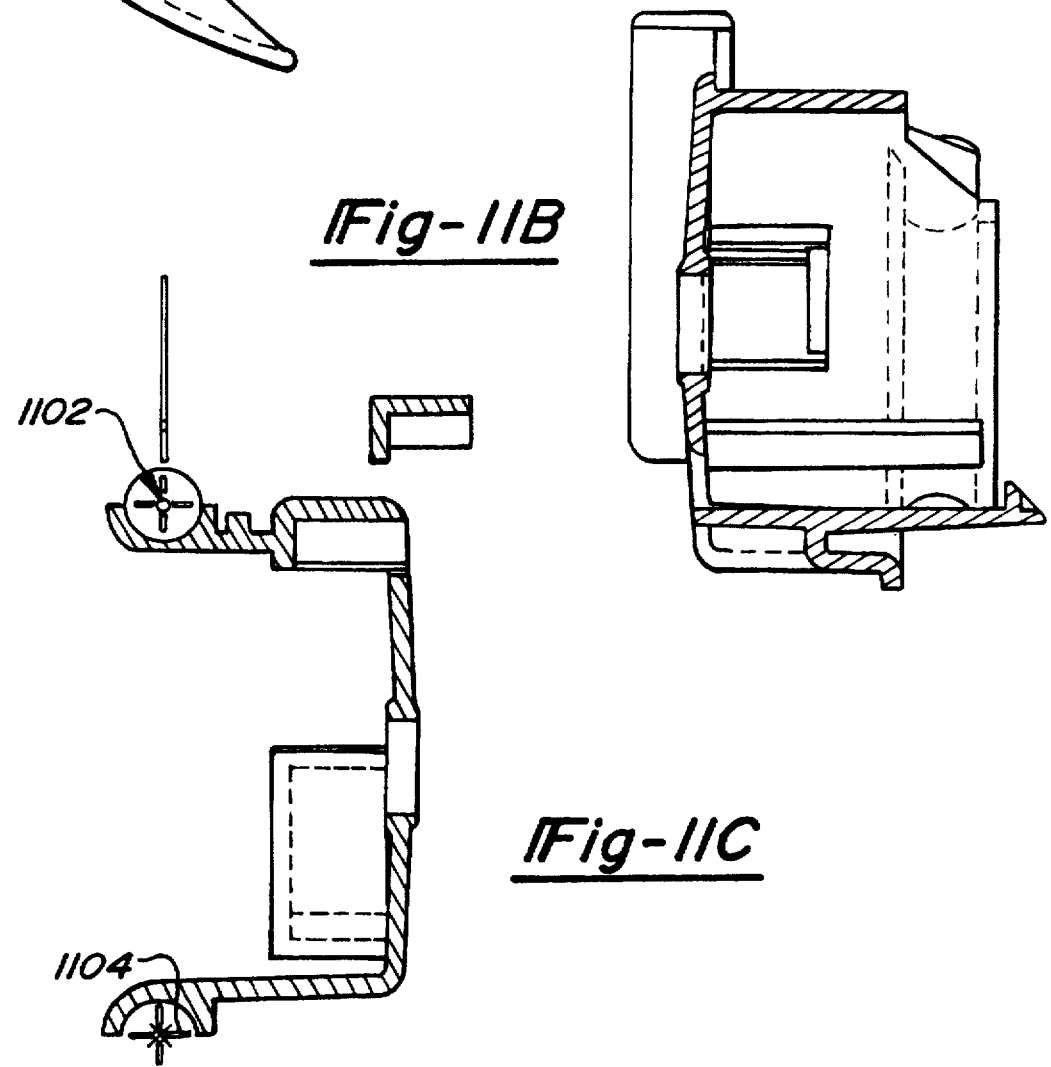
*Fig-11C*

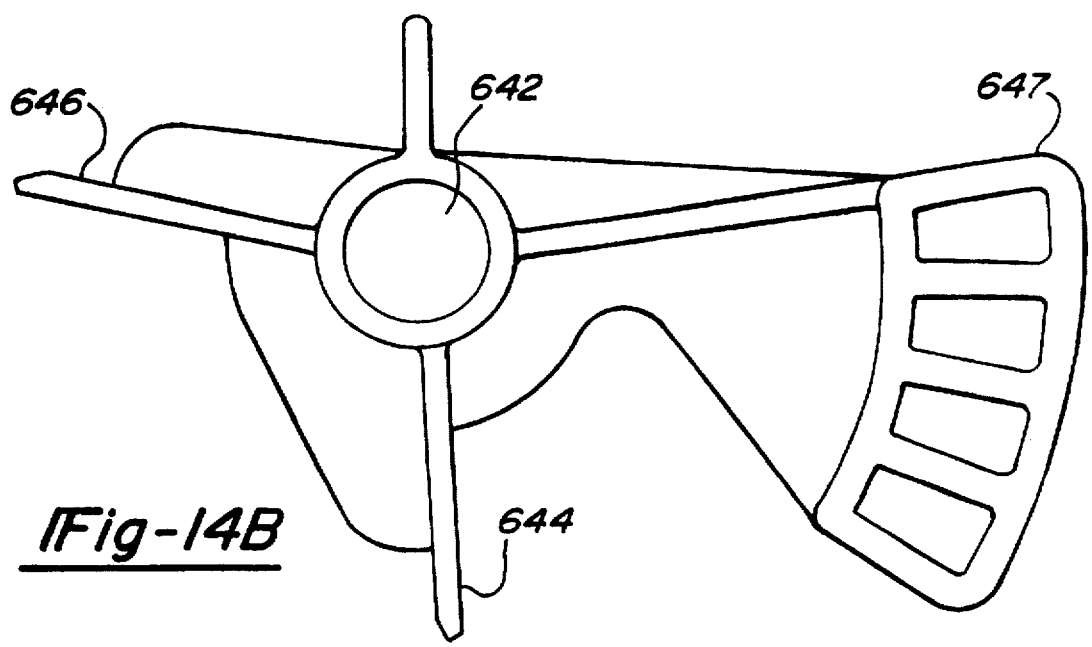
Fig-14B
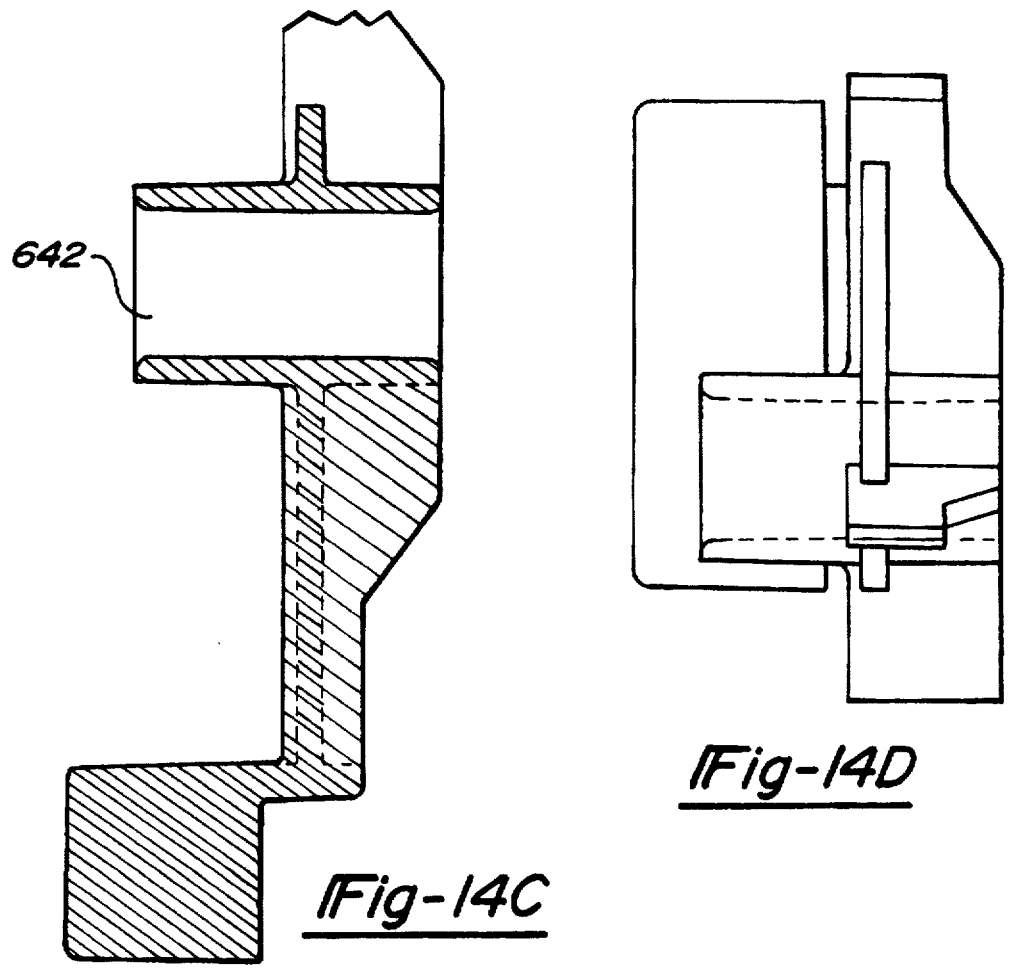
Fig-14C
Fig-14D

MOTOR MECHANISM FOR CHILD'S SWING

BACKGROUND OF THE INVENTION

1. Field of The Invention

The present invention relates to a spring motor mechanism, and in particular, to a spring motor mechanism for use in a child's swing having an adjustable swing height, an over-wind protection device, and a remaining swing indicator device.

2. Description of The Related Art

Spring motor mechanisms are well known and subject to various applications, however, they are especially suited for use in a child's swing and will therefore be particularly described in that connection. Child swings are often powered by a torsion spring, typically formed from wire, that receives and stores an input torque when wound by an operator through use of a handle linked to a crankshaft. The handle and crankshaft are typically located at the "winding end" of the device. The spring motor mechanism, typically located at the "escapement end" of the device, controls the release of the torque stored in the spring to sustain a decreasing, periodic oscillation that drives a swing seat containing a child.

Springs used in known spring motor mechanisms include a plurality of coils. As the spring is wound, the number of coils is increased as the diameter of each coil is decreased. In this way, the length of the spring grows while the spring diameter shrinks. Preferable springs may therefore have coils within coils in a "telescope" fashion to fit a longer spring into the spring housing. As the spring is wound, more and more torque is stored. When the spring is allowed to unwind, the stored torque is released at a rate that is related to the number of coils present in the spring. Therefore, for purposes of swing duration, it is the number of coils that is significant rather than the amount of stored torque. Moreover, as the spring unwinds, the output torque per coil decreases so that the initial coil unwinding releases a larger amount of torque than later unwinding of the coils. This causes the swing to oscillate higher initially than it does when the spring is almost unwound.

Spring motor mechanisms driven by wound torsion springs suitable for use in a child's swing are previously known and have been disclosed, for example, in U.S. Pat. Nos. 4,165,872 to Saint and 5,083,773 to Saint, among others. In the known device, the torsion spring is wound to create a torque that acts upon a ratchet wheel and a carriage.

In the known mechanism, the winding end of the device includes a handle and crankshaft structure as discussed above. The crankshaft is joined directly or indirectly to the spring so that the rotation of the handle and crankshaft winds the spring. As discussed above, the rotational force applied to the spring by the rotating handle tightens the spring coils causing the coils to shrink in diameter. Eventually, with sufficient winding, the wire spring will substantially deform, possibly damaging the torsion spring. Thus, a disadvantage with known spring motor mechanisms is that the spring may become damaged if it is over wound by the operator. A further disadvantage in conventional spring motor mechanisms is that the spring may become inadvertently disengaged at the escapement end and unwind rapidly and uncontrollably creating an alarming sound and a potential safety risk. Another disadvantage of known spring motor mechanisms is that they unwind quickly thereby reducing the duration of the swing oscillation. Still another disadvantage of the known spring motor mechanisms is that they release excess torque during the initial unwinding of the spring. Still another disadvantage of the known spring motor mechanism is that the operator has no way of knowing, at any given time, the number of swing oscillations that can be completed (i.e., the amount of stored energy remaining) before the spring must be re-wound. Yet another disadvantage of the known spring motor mechanisms is that they do not account for variations in the users' weight. Thus, a conventional spring motor mechanism that supplies sufficient torque to appropriately swing a larger, heavier child tends to over-swing a smaller, lighter child.

A further disadvantage with known swings is that they have housings with hard edges that are an obstacle and a safety hazard when the child is put in or removed from the child swing. Still another disadvantage with the known swings is that their housings have an open bottom where an operator's finger could get pinched by the internal spring mechanisms Still another disadvantage is that the swinging motion of the swing creates an opening in the housing exposing the spring's internal mechanisms thus creating a safety risk. Still another disadvantage is that the swing arms, which must be bent to a specific angle to maximize swing duration, are often not bent properly due to manufacturing tolerances. Still another disadvantage is that the crank wire connecting the handle to the spring can be dangerously exposed causing a hazard that could pinch the user's fingers. Still another disadvantage is that the internal spring mechanism is difficult to assemble.

SUMMARY OF THE INVENTION

An object of the present invention is therefore to provide a spring motor mechanism for use in a child's swing that prevents over-winding by the operator. Another object of the present invention is to provide a spring motor mechanism wherein the spring is prevented from unwinding rapidly and uncontrollably. Another object of the present invention is to provide a spring motor mechanism that will generate an increased number of swing oscillations. Still another object of the present invention is to provide a swing motor mechanism that does not release excessive torque when the spring initially begins to unwind. Still another object of the invention is to provide a more accurate indication to the operator of the number of remaining oscillations that can be completed before the spring must be re-wound. Yet another object of the present invention is to provide a spring motor mechanism that can satisfactorily oscillate either a relatively heavy child or a relatively light child. A further object of the present invention is to provide an adjustable child swing that can swing higher or lower depending upon the preference of the swing operator.

A further object of the present invention is to provide a swing housing having rounded edges and that is less of an obstruction when the child user is put in and removed from the child swing. A further object of the present invention is to provide a swing housing that is closed at the bottom, even when the swing is oscillating, to prevent injury to the operator or child user. Another object of the present invention is to provide a swing that has hanger arms that are consistently bent at a proper angle. Still another object of the present invention is to provide a handle that does not have an exposed crank wire. Still another object of the present invention is to provide an internal spring mechanism that is simpler to assemble.

To achieve these and other advantages and in accordance with the purpose of the invention, as embodied and broadly described, the invention provides an over-wind protection system to prevent the over-winding of a motor mechanism for a child swing, comprising a main spring having an energy storing section and an end section, and a spring sleeve having an opening and an inner surface with the end section of the main spring being disposed adjacent to the inner surface, the end section being compressed and exerting an outward force on the inner surface such that the end section and the spring sleeve are fixedly attached when the main spring applies a torque below a predetermined maximum torque, and such that the end section relatively rotates with respect to the spring sleeve when the predetermined maximum torque is exceeded.

In addition, the invention provides for a wind indicator disposed within a housing for displaying a relative torque provided by a main spring to the wind indicator comprising a spring coupling connected to an end of the main spring, an indicator engaged with the spring coupling for receiving a torque transferred from the main spring, the indicator capable of rotating in response to an applied torque, and a bias spring engaged with the indicator and the housing to provide a counter torque opposite to the main spring torque such that the indicator's rotational position is altered in response to the torque applied by the main spring and the counter torque applied by the bias spring.

The invention provides for an adjustable swing mechanism for controlling the oscillation angle of a child swing that is powered by torque stored in a main spring, comprising a ratchet gear having a plurality of teeth, the ratchet gear being connected to a main spring, a pawl located adjacent to the ratchet gear, the pawl engaging with the ratchet gear while the ratchet gear is rotating in a direction counter to the torque stored in the spring and disengaging with the ratchet gear while the ratchet gear is rotating in a direction identical to the torque stored in the spring, a dog located adjacent to the ratchet gear, the dog engaging with the ratchet gear while the ratchet gear is rotating in a direction identical to the torque stored in the spring and disengaging with the ratchet gear while the ratchet gear is rotating in a direction counter to the torque stored on the spring, an actuator located adjacent to the dog and pawl for controlling the engagement and disengagement of the dog and the pawl with the ratchet gear such that the dog and pawl engage with each sequential, counterclockwise tooth of the rachet gear after each oscillation, and an adjustable actuator located adjacent to the dog to direct the dog into the same ratchet tooth on successive oscillations when the maximum oscillation angle of a child swing exceeds a predetermined amount.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate one embodiment of the invention and together with the written description serve to explain the principles of the invention. In the drawings:

FIG. 6D is a perspective view of the lever;

FIG. 6E is a perspective view of the actuator;

FIG. 6F is a perspective view of the ratchet wheel;

FIG. 11A is a view of the wind indicator;

FIG. 11B is a cross-sectional view of the wind indicator;

FIG. 11C is a cross-sectional view of the wind indicator;

FIG. 14B is a view of the actuator;

FIG. 14C is a cross-sectional view of the actuator

FIG. 14D is a side view of the actuator

DETAILED DESCRIPTION OF THE PREFERRED EMBODIMENTS

Reference will now be made in detail to the present preferred embodiment of the invention, an example of which is illustrated in the accompanying drawings.

Figure 1:
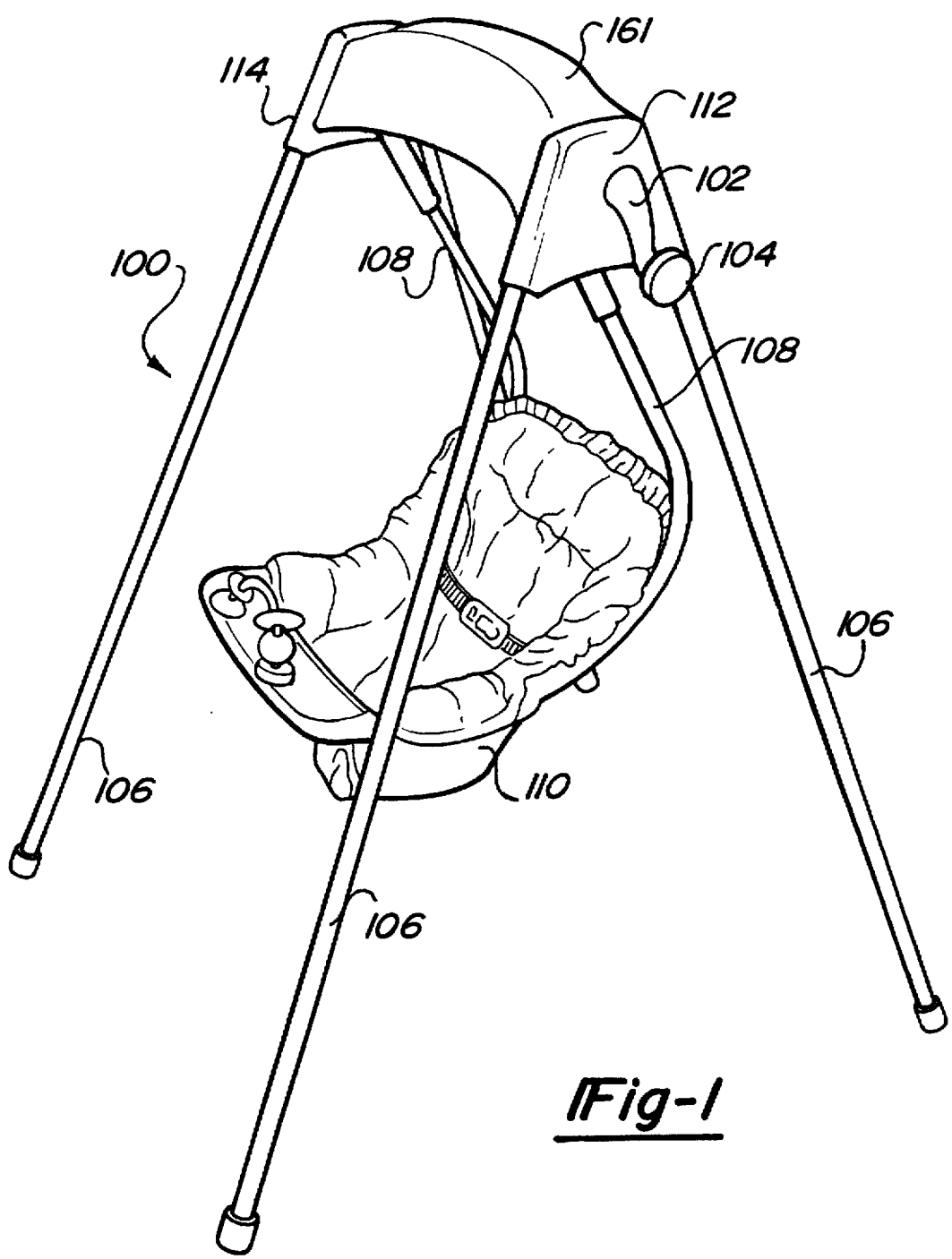
FIG. 1 is a perspective view of the child swing.

As shown in FIG. 1, swing 100 includes housing 101 that is preferably formed from a sturdy, molded plastic material. Housing 101 accommodates a spring mechanism 201, which will be described in further detail below, that drives the swing 100. Housing 101 functions to protect the spring mechanism from dust and debris, and it also protects the operator and user from possible injury resulting from contact with the interior mechanism and spring during use.

In this regard, the housing has an enclosed bottom having only two narrow slots to allow a first hanger 414 and a second hanger 602 to extend through. In addition, the first and second hanger include a cup section that covers the slots in the bottom of the housing to additionally cover the internal mechanism. Swing housing 101 has rounded edges to prevent injury to the user's head in the event of an inadvertent collision with an edge of the housing. For this same reason, housing 101 has a front side that is concave to allow the user more space to insert and remove from child seat 110. Handle 102 is connected to a crank shaft (not shown) which, in turn, is connected to a main spring 200 within housing 101. Rotation of handle 102 causes a rotation of the crankshaft thereby supplying an input torque to the interior spring mechanism.

Another function of the housing 101 is to receive legs 106 that elevate and support swing 100. Accordingly, housing 101 has a first side 112 and a second side 114 which are each roughly triangular in shape to secure legs 106 in such a manner that they can be positioned in a spread fashion during operation of the swing 100 to increase the stability of the device. First side 112 supports a handle 102 having a knob 104. Knob 104 and handle 102 protect the user from injury due to pinching by a crankshaft wire.

Yet another function of housing 101 is to support child seat 110. Accordingly, two support arms 108 are attached to a drive mechanism 201 which is suspended from housing 101. Support arms 108 are preferably curved in shape to reach under and grasp a child seat 110. During operation of the swing, main spring 200 transfers its torque via a drive mechanism 201 to oscillate support arms 108 which, in turn, oscillate child seat 110.

Figure 2A:
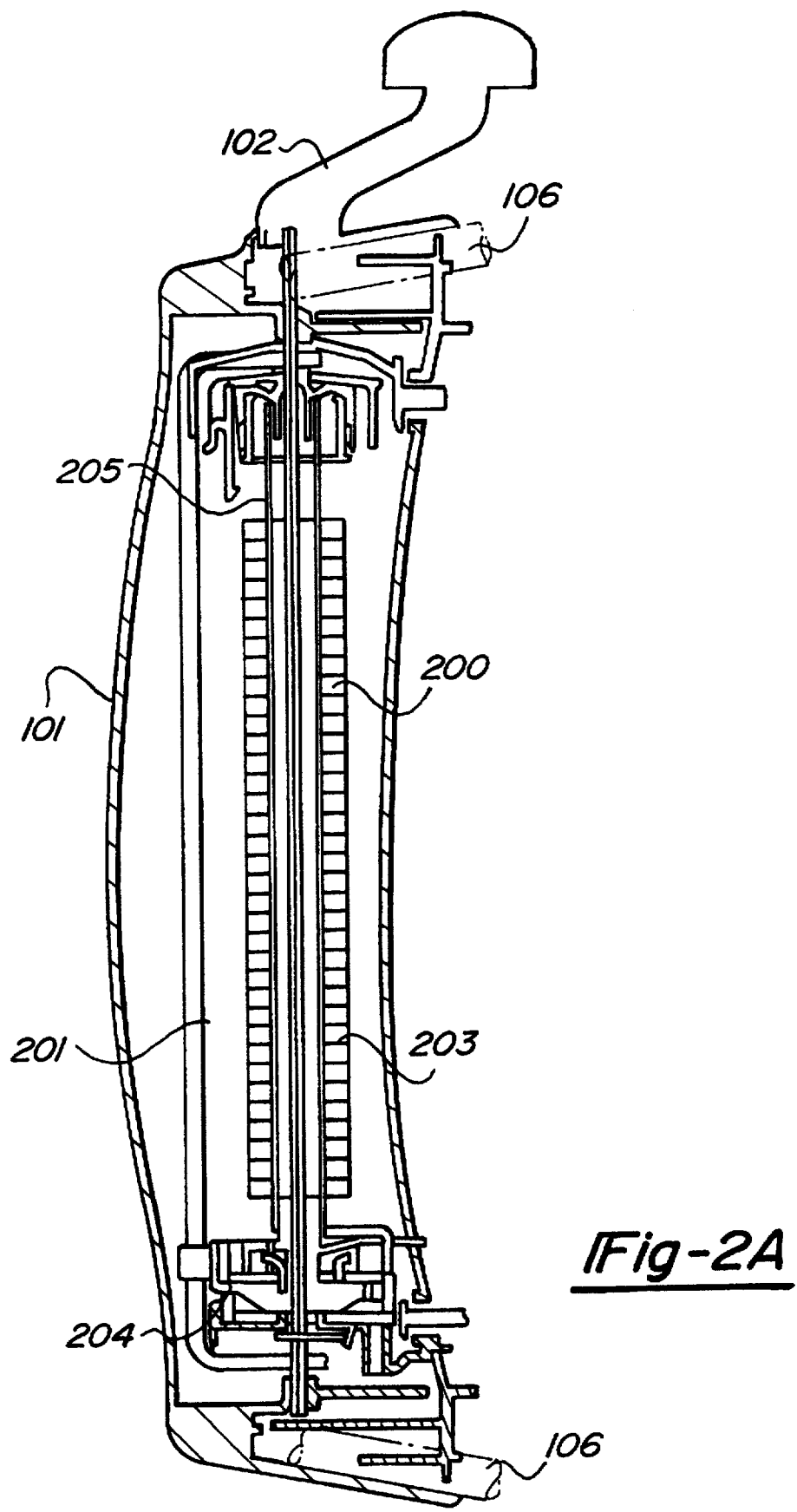
FIG. 2A is a cross-sectional view of the child swing housing.
Figure 2B:
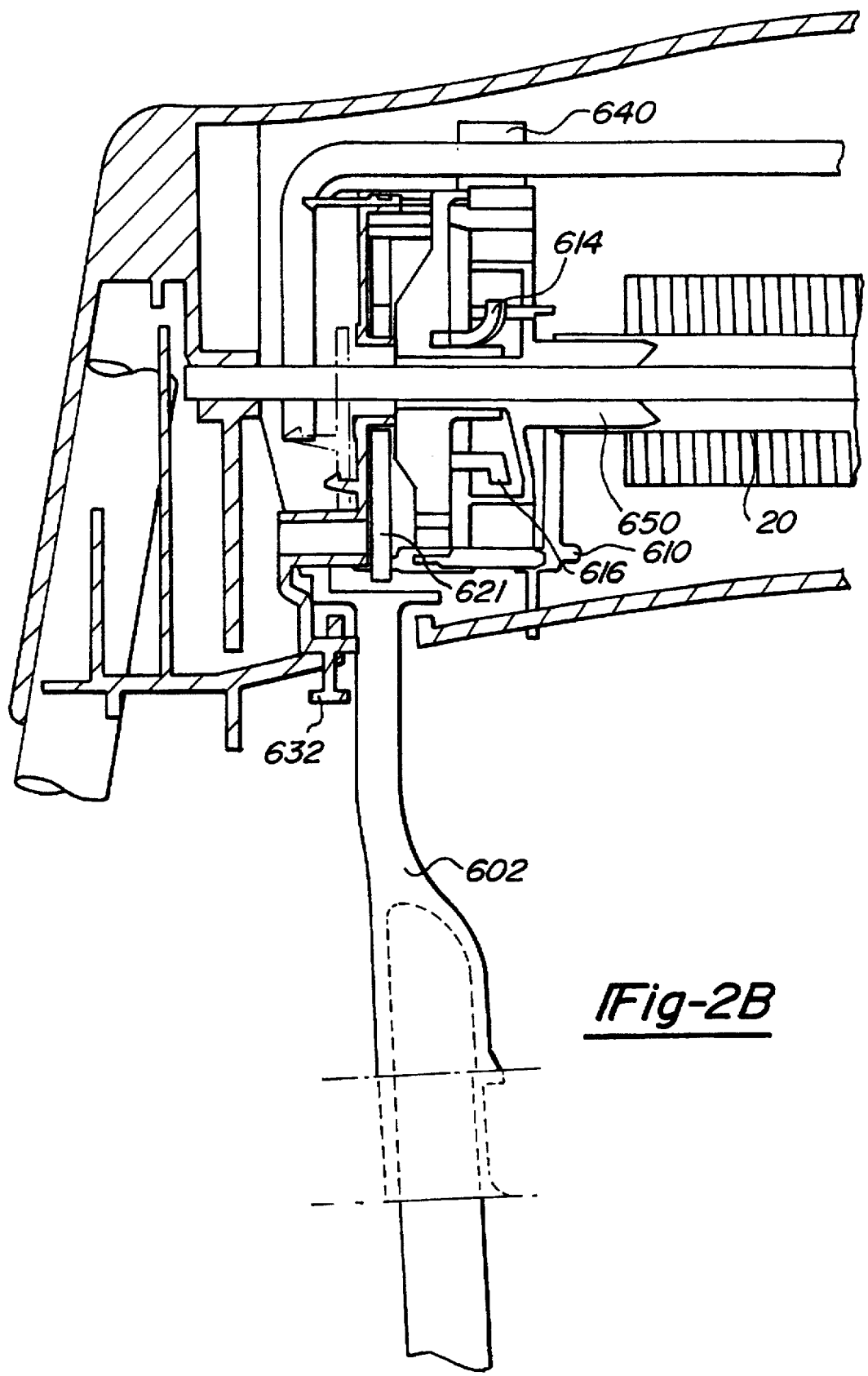
FIG. 2B is a cross-sectional view of the escapement end of the child swing.
Figure 2C:
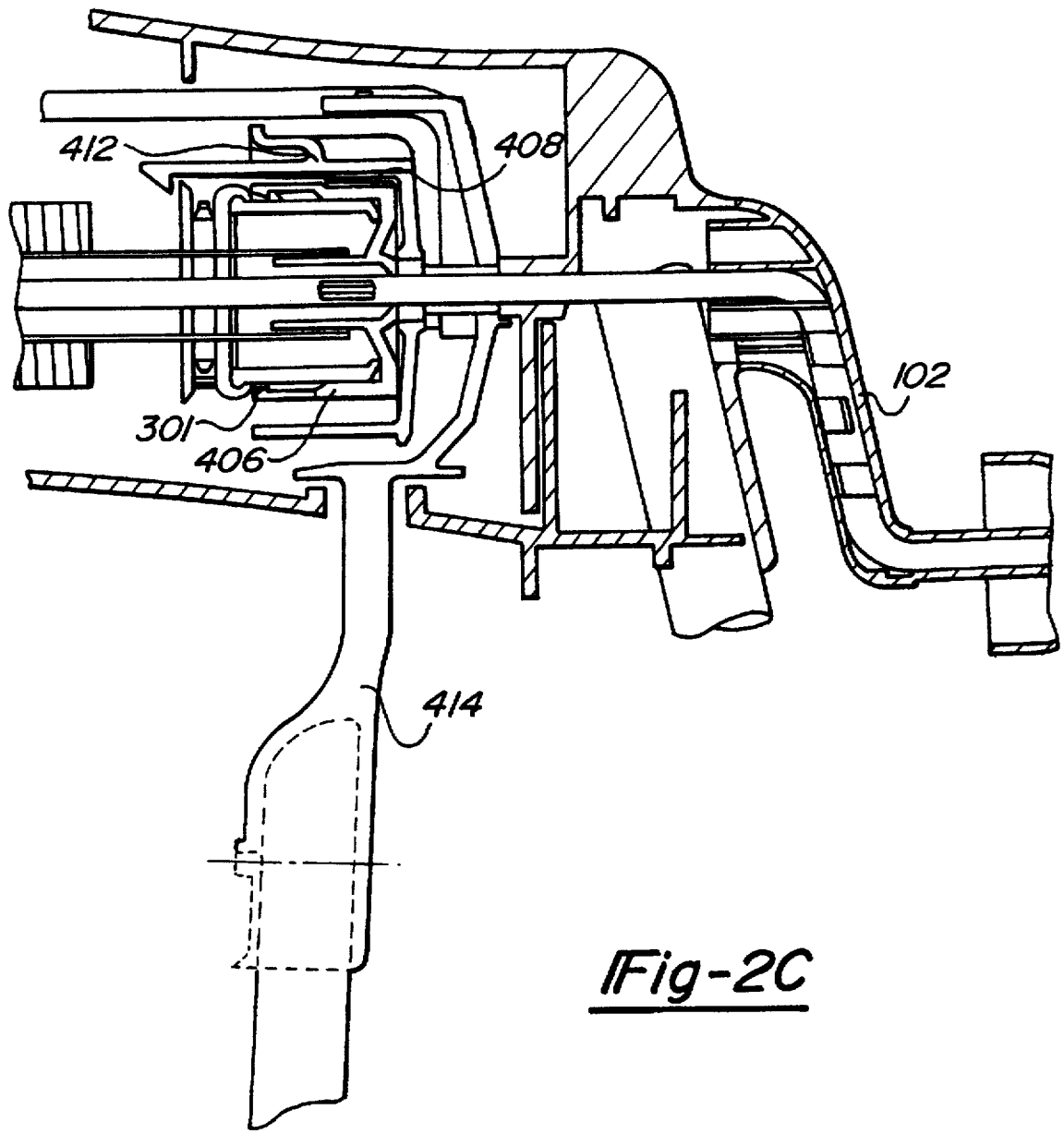
FIG. 2C is a cross-sectional view of the winding end of the child swing.
Figure 2D:
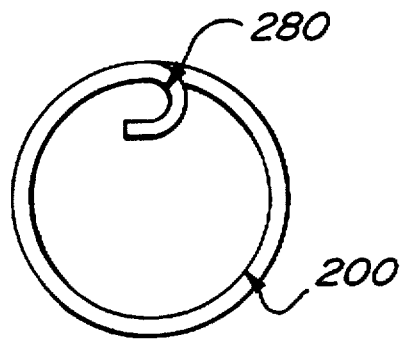
FIG. 2D is a first end view of the main spring.
Figure 2E:
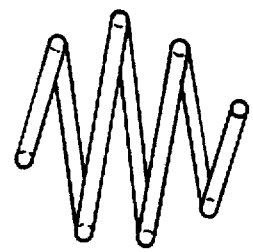
FIG. 2E is a cross-sectional view of the main spring.
Figure 2F:
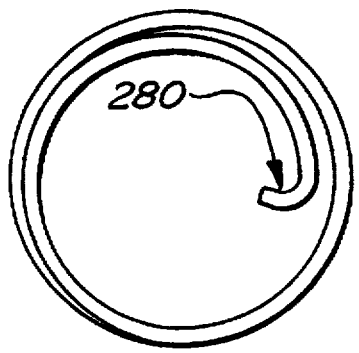
FIG. 2F is a second end view of the main spring.
Figure 2G:
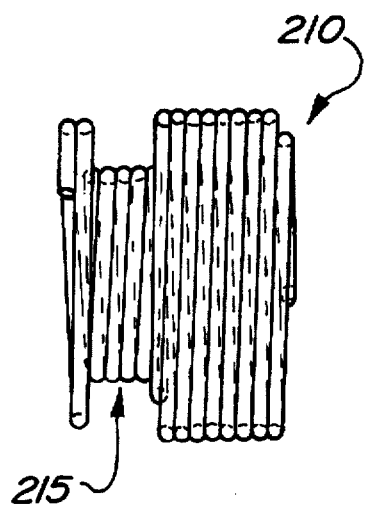
FIG. 2G is a cross-sectional view of slide-end of the main spring.

Main spring 200 is generally described in FIG. 2A. FIG. 2B shows the escapement end 204 of the swing motor mechanism in a cross-sectional view. Displayed are second hanger 602, lever 632, adjusting actuator 621, pawl 616, mounting bracket 610, ratchet gear 650, actuator 640, and dog 614. FIG. 2C shows wind end 202 of the swing motor mechanism. Displayed are first hanger 414, spring sleeve 301, spring sleeve cover 406, wind indicator 412, backwind stop 408, and handle 102. FIG. 2D shows an end of main spring 200 with a bent end wire portion 280 that can engage with the ratchet wheel 650. FIG. 2E shows the coils of main spring 200 where the coils are not of uniform diameter, but instead are of variable diameter so that they can fit "telescope style" within one another. FIG. 2F shows another end of main spring 200 where bent end portion 280 is configured to engage with a portion of spring sleeve cover 406 to create a clicking sound when the spring is wound to a maximum torque. FIG. 2G shows an end of main spring 200 that cooperates with wind end 202 of the spring motor mechanism. Shown is neck 215 and slip coil section 210. Slip coil section 210 has a greater diameter than neck section 215 so that the slip coil section can be wound down to be inserted into spring sleeve 301 and create an expansion force.

Main spring 200 is positioned within housing 101, and includes a plurality of coils 203 that run the length of the spring. The purpose of main spring 200 is to receive and store an input torque generated during the winding of handle 102. Although the coils 203 of main spring 200 may have different diameters, some springs have coils of uniform size. Most preferred main springs have a larger diameter slip coil section 210, a small diameter neck section 215, a variable diameter power section 220, and a small diameter mounting section 225.

Located on a first side 112 of housing 101 is a wind end portion 202. Wind end portion 202 receives the input torque from handle 102 and applies it to main spring 200. Wind end portion 202 also includes a slip clutch 300 that prevents main spring 200 from becoming over-wound and a wind indicator system that indicates to the operator of the swing the approximate number of oscillations that remain before main spring 200 must be re-wound (i.e., the amount of stored energy remaining). As discussed below, the wind indicator functions by measuring the level of torque generated by the spring at a given time. This information can then be used to estimate the number of times the spring can rotate before it must be re-wound.

Located on a second side 114 of housing 101 is an escapement end portion 204. Escapement end portion 204 receives an output torque from main spring 200 and converts it to a decreasing, periodic oscillating rotational force that can be used to swing the child seat 110. In addition, escapement end portion 204 includes a swing height adjustor that can be used to control the height of the oscillation of child seat 110 and lengthen the duration of the swing operation before the spring must be re-wound. The features of wind end portion 202 and escapement end portion 204 will be discussed in further detail below.

Figures 3, 4:
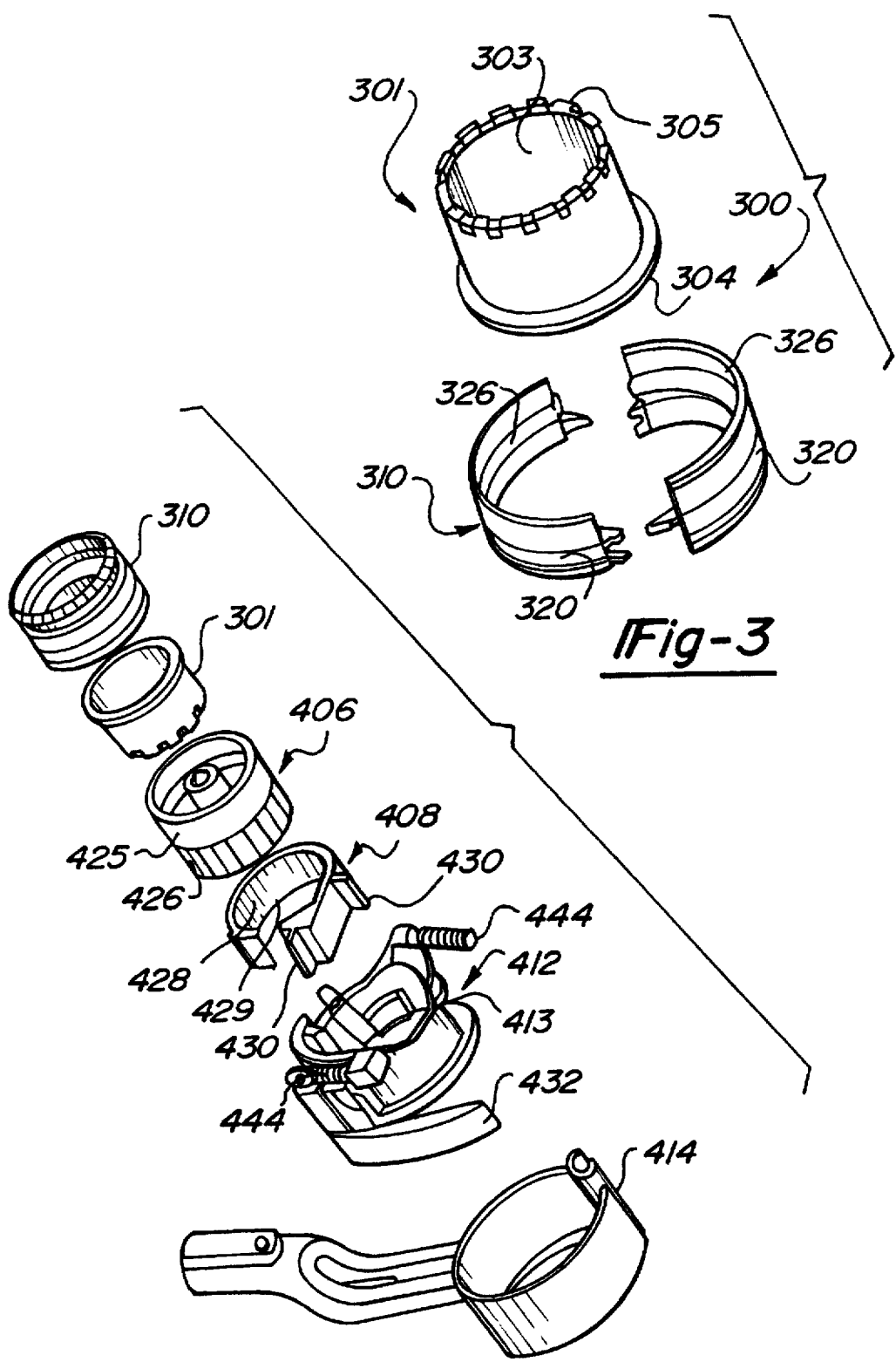
FIG. 3 is an exploded view of the slip clutch mechanism.
FIG. 4 is an exploded view of the wind end portion of the child swing motor mechanism.
Figure 7:
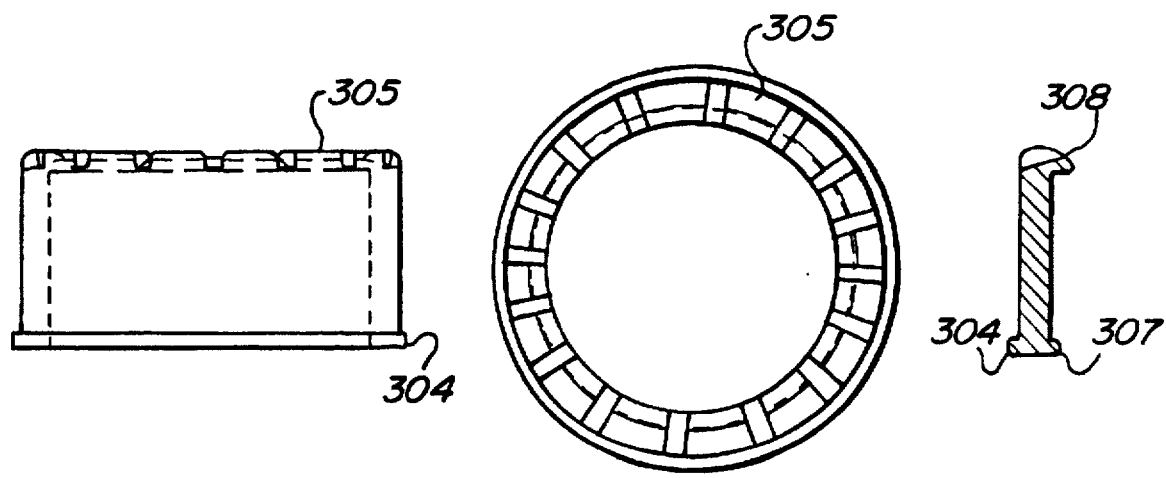
FIG. 7 is a view of the spring sleeve.

Referring to FIG. 3, wind end portion 202 includes a slip clutch mechanism 300 that prevents the operator from over-winding main spring 200. Slip clutch mechanism 300 includes a spring sleeve 301 and a spring sleeve grip 310. Spring sleeve 301 is preferably a hollow, tubular structure framed from a molded plastic. Spring sleeve 301 includes at least one open end portion to receive slip coils 210 of main spring 200. Spring sleeve 301 receives slip coils 210 of the main spring. In the preferred embodiment, slip coils 210 of main spring 200 are temporarily wound tightly and slightly smaller than the inner diameter of the spring sleeve 301 for insertion into spring sleeve 301. The slip coils are then allowed to unwind and expand to press against an inner surface 303 of spring sleeve 301. In the preferred embodiment, spring sleeve 301 also includes an inner lip 308, an edge 305 having uniform gaps and teeth, and an outer lip 304. See FIG. 7. Inner lip 308 positions the slip coils and prevents the main spring from sliding forward in spring sleeve 301. Edge 305 engages with a corresponding structure in spring sleeve cover 406 to transfer torque to and from main spring 200. Outer lip 304, as discussed below, is used to connect spring sleeve 301 to the spring sleeve grip 310.

Inner surface 303 of spring sleeve 301 has a frictional coefficient such that the expansion force created by the expanding slip coils 210 generates a frictional force that prevents main spring 200 from sliding or turning within spring sleeve 301 during normal use. However, when over-winding occurs, the coils 203 will shrink in diameter and the spring torque will increase. Accordingly, inner surface 303 has a desired circumference and frictional coefficient such that the main spring 200 will slip within the inner surface 303 when a sufficient amount of winding of main spring 200 has occurred (i.e., a predetermined amount of spring torque and coil shrinkage have occurred), thereby preventing the over-winding of main spring 200. Spring sleeve 301 also has an interior entry lip 307 that prevents a coil in the neck portion from sliding out of spring sleeve 301 during assembly.

Slip clutch mechanism 300 has the added advantage of being able to function with a wide variety of main spring types regardless of their material or the amount of energy that they can store. Thus, slip clutch mechanism 300 will function satisfactorily with main springs that are manufactured at the extremes of specified production parameters. In addition, slip clutch 300 also includes a device that generates a "clicking" sound that occurs when the slip clutch is in operation (i.e., a relative rotation occurs between the spring sleeve 301 and the main spring) to notify the operator that additional winding is no longer necessary. Specifically, main spring 200 has a bent end wire portion that rests against a projecting portion 928 of spring sleeve cover 406. When the spring is being wound, the bent end wire portion is bent, (not shown in the drawings) rotates along with projecting portion 928 during normal winding. However, when the spring is being over-wound, bent end wire portion 928 of main spring 200 remains still due to the sliding of the spring within the spring sleeve 406, while projecting portion 928 spins. As the two parts come into contact, a clicking sound is generated.

After main spring 200 is inserted into spring sleeve 301, spring sleeve grip 310 is then clamped into place around both the neck 215 of main spring 200 and outer lip 304 of spring sleeve 301 to assure that main spring 200 does not inadvertently slide out of spring sleeve 301. Spring sleeve grip 310 preferably includes two identical, semi-circular portions which can be joined together when the piece is assembled around outer lip 304 of spring sleeve 300.

Figure 8A:
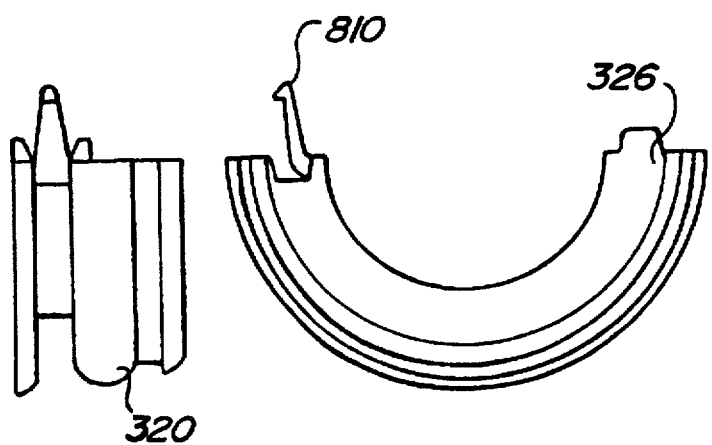
FIG. 8A is a view of the spring sleeve grip.
Figure 8B:
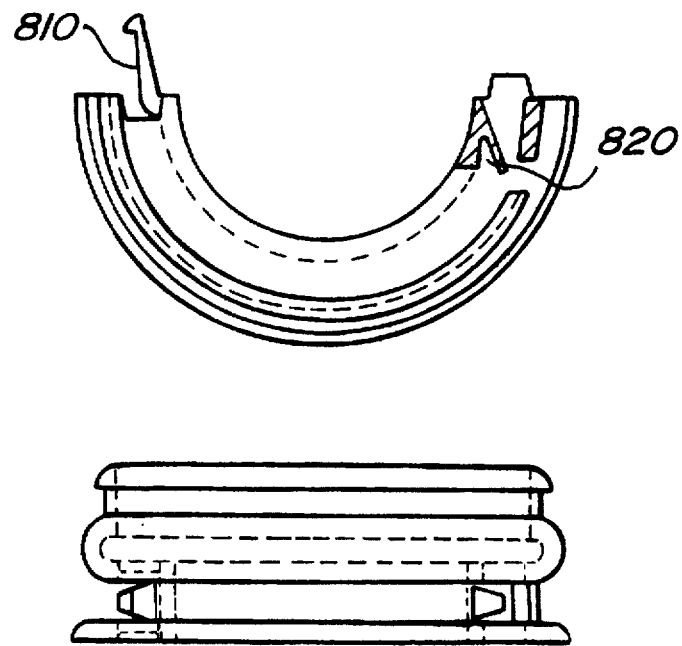
FIG. 8B is an enlarged view of the spring sleeve grip.

As shown in FIG. 8A, the two semi-circular portions of spring sleeve grip 310 have a tab and clip on opposite ends that engage to lock the two portions when they are in place. FIG. 8B shows spring sleeve grip 310 with tab 810 and slot 820. When the two identical portions of spring sleeve grip 310 connect, tab 810 clips in and engages with slot 820. After main spring 200 is inserted into spring sleeve 301, the two portions of spring sleeve grip 310 are snapped around spring sleeve 301 and main spring 200. Outer lip 304 engages with large groove 326 on the interior side of spring sleeve grip 310. In this way, spring sleeve 301 and spring sleeve grip 310 cooperate to grasp and hold main spring 200 and prevent main spring 200 from disengaging and unwinding quickly and uncontrollably. However, as described above, spring sleeve grip 310 grips main spring 200 around spring sleeve 300 in such a way that main spring 200 can turn and slide within spring sleeve 300 when a predetermined torque has been exceeded.

Referring to FIG. 4, wind end portion 202 also includes a wind indicator mechanism 400 for indicating the amount of stored energy remaining in the main spring and the approximate number of oscillations remaining before the main spring 200 must be re-wound. Of course, it is understood that the wind indicator mechanism is calibrated so that the operator can determine the number of remaining oscillations based on the indicated torque. Wind indicator mechanism 400 preferably includes spring sleeve 301, spring sleeve grip 310, sleeve cover 406, back wind stop 408, wind indicator 412, and a first hanger 414. First hanger 414 and second hanger 602 have a bent leg portion that permits the swing to oscillate in a balanced fashion thereby extending the duration of the oscillation and preventing the waste of energy. Because this bend is located in the hanger portions, which are preferably molded from plastic, the proper bend angle can be consistently achieved during manufacture. Fluctuation in the bend angle can affect the operation of the escapement end and the release of energy by the swing to create inefficient operation.

Figures 9A, 9B:
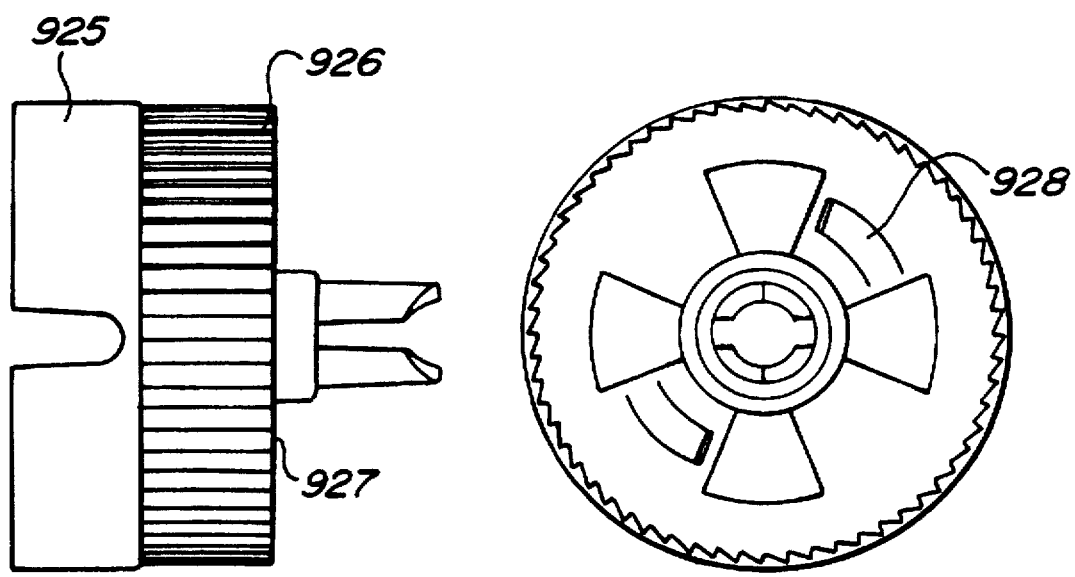
FIG. 9A is a side view of the spring sleeve cover.
FIG. 9B is a top view of the spring sleeve cover.
Figure 9C:
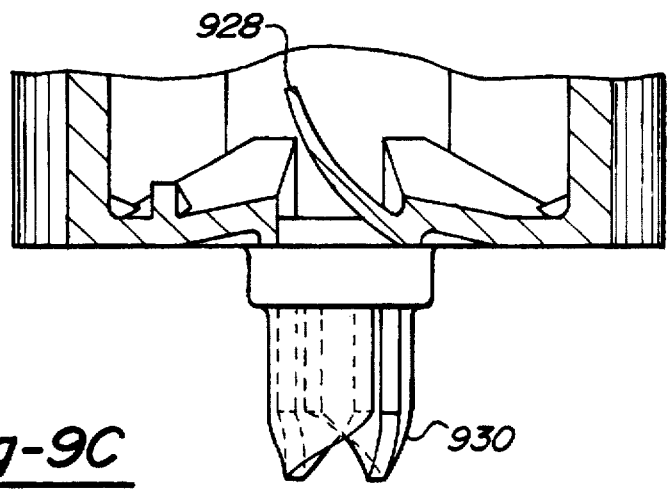
FIG. 9C is a cross-sectional view of the spring sleeve cover.
Figure 10:
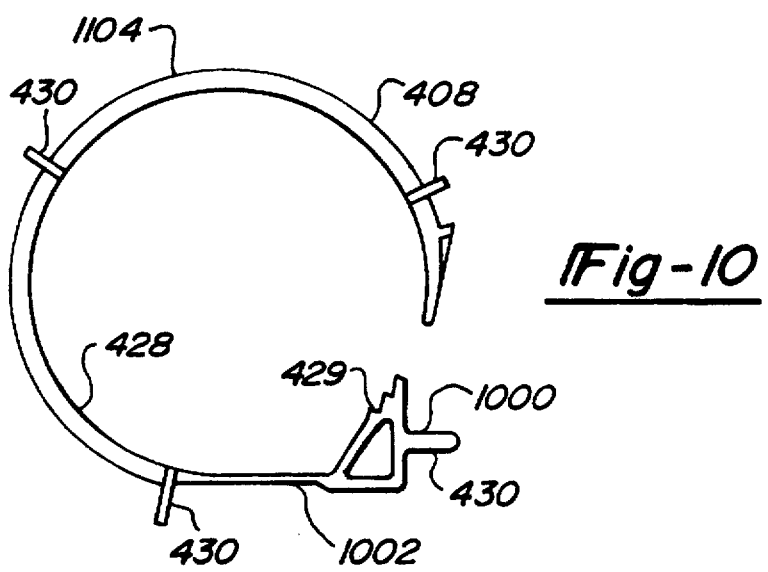
FIG. 10 is a view of the back wind stop.
Figure 15A:
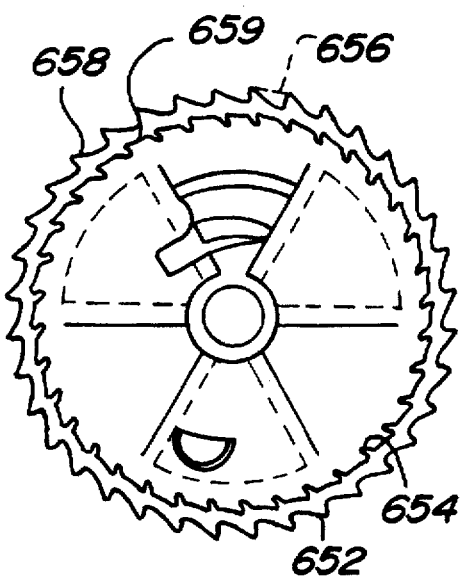
FIG. 15A is a front view of the ratchet wheel.
Figure 15B:
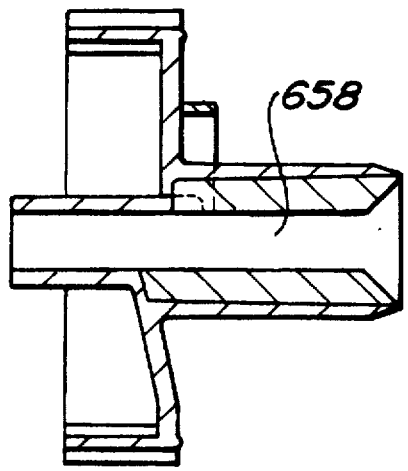
FIG. 15B is a cross-sectional view of the ratchet wheel.
Figure 15C:
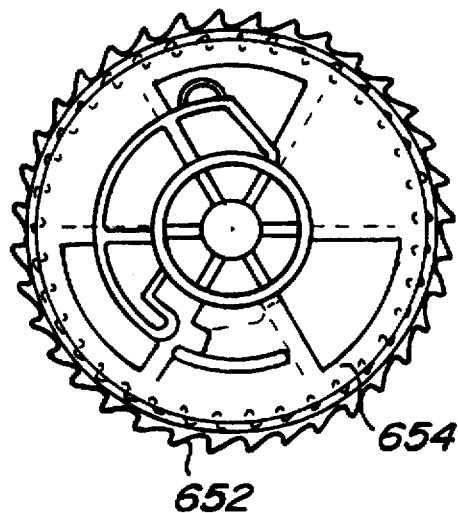
FIG. 15C is a back view of the ratchet wheel.

Main spring 200, not shown in FIG. 4, is attached to spring sleeve 301 and spring sleeve grip 310 as described above. Spring sleeve 301 has edge 305 which interconnects with ribs within spring sleeve cover 406. Thus, the output torque from spring 200 will be transferred to spring sleeve cover 406 via spring sleeve 300 and spring sleeve grip 310. Spring sleeve cover 406 is preferably a cylindrical cup-shaped structure having projecting lips that receive a crankshaft. See FIG. 9A and B. FIGS. 15B and D show a cross-sectional view of ratchet wheel 650 which includes a projecting portion 928 and lips 930 that receive a crankshaft (not shown). As stated above, spring sleeve cover 406 has ribs (not shown) on its inner surface that cooperate with edge 305 of spring sleeve 301. Spring sleeve cover 406 has on its outer side a smooth portion 925 and a tooth portion 926. Tooth portion 926 contains jagged shark teeth 927 which are each pointed in the same general direction.

Spring sleeve cover 406 fits inside back wind stop 408. Backwind stop 408 is preferably a "C" shaped structure that is flexible such that the space between the ends of backwind 408 can be flexed together, thereby reducing the backwind stop diameter. Backwind stop 408 has a working portion 1000, a flexible portion, and a clamping portion 1004. In addition, backwind stop 408 includes projecting portions 430 which extend a small distance radially from the outer surface. Back wind stop 408 has an interior portion 428 that also has shark teeth 429 each pointing in the same direction to engage with the shark teeth 927 found on portion 926 of spring sleeve cover 406. When main spring 200 is being wound, spring sleeve cover 406 rotates freely within back wind stop 408 because backwind stop 408 lightly clamps spring sleeve cover 406.

Accordingly, their respective teeth preferably do not, or only slightly contact during winding so that the device can be wound silently because of the torque placed on the backwind stop by friction which deforms the backward stop slightly. However, when main spring 200 is releasing its output torque in the opposite rotational direction through spring sleeve cover 406, the friction between shark teeth 428 and the shark teeth 927 of backwind stop 408 causes backwind stop 408 to flex (deform) such that shark teeth 428 of backwind stop 408 fully engage with shark teeth 429 of the spring sleeve cover causing the two pieces to lock up, after backwind stop 408 has tended to rotate in the same direction as the output torque of main spring 200. This desired deformation is caused by the mounting points and the shape of the backwind stop.

Back wind stop 408 is, in turn, mounted within wind indicator 412. Wind indicator 412 generally has a "shallow cylindrical cup" shape and preferably includes a generally circular cross-section to allow the wind indicator to fit within the generally circular portion of a first hanger 414. FIG. 11B shows a cross-sectional view of wind indicator 412. FIG. 11C shows a second cross-sectional view of wind indicator 412. Each cross-sectional view indicates the cup-shaped structure of the piece. Additionally, FIG. 11C shows spring knobs 1102 that engage with an end of a bias spring 444 and a curved shot 1104 that receives a bias spring 414. FIG. 11D shows a top view of wind indicator 412 where spring knobs 1102 are shown. FIG. 11E shows a side view of wind indicator 412 with spring knob 1102 and clip 1106 that engages with other portions of wind end 202 to rotationally secure the wind end 202. FIG. 11F shows a bottom view of wind indicator 412 with projecting portions 446, and slots 1108 that receive and secure an end of backwind stop 408. Also shown is round hole 1110 that allows the spring to engage with ratchet wheel 650.

Figure 11G:
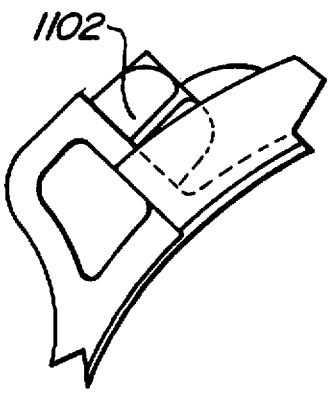
FIG. 11G is a partial view of the wind indicator.
Figure 11H:
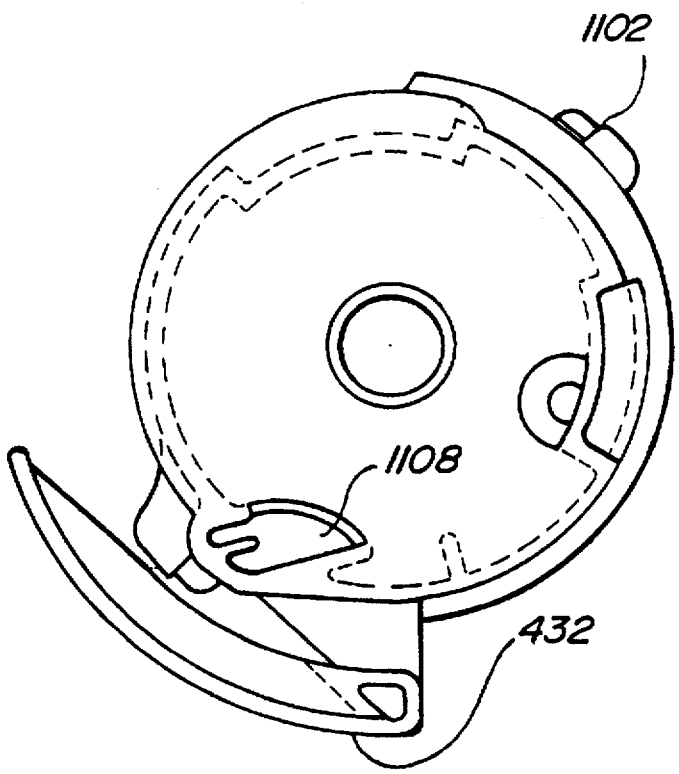
FIG. 11H is a top view of the wind indicator.
Figure 11I:
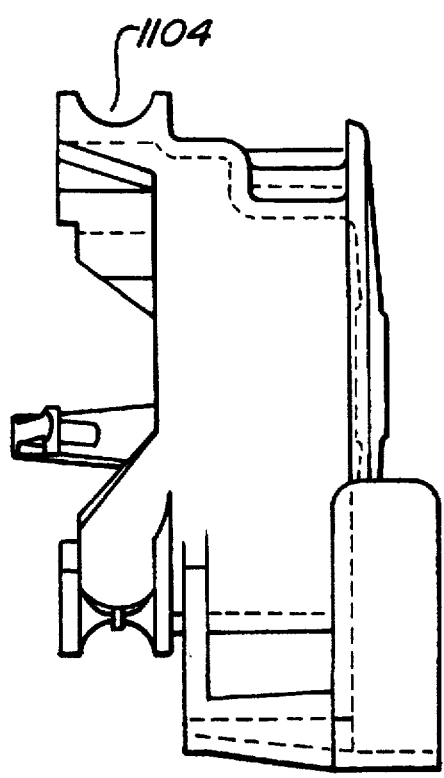
FIG. 11I is a side view of the wind indicator.
Figure 11D:
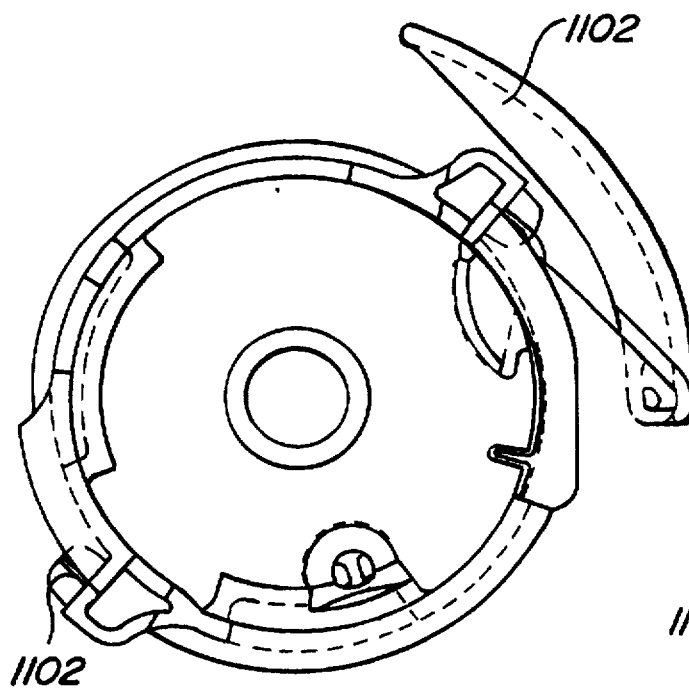
FIG. 11D is a top view of the wind indicator.
Figure 11E:
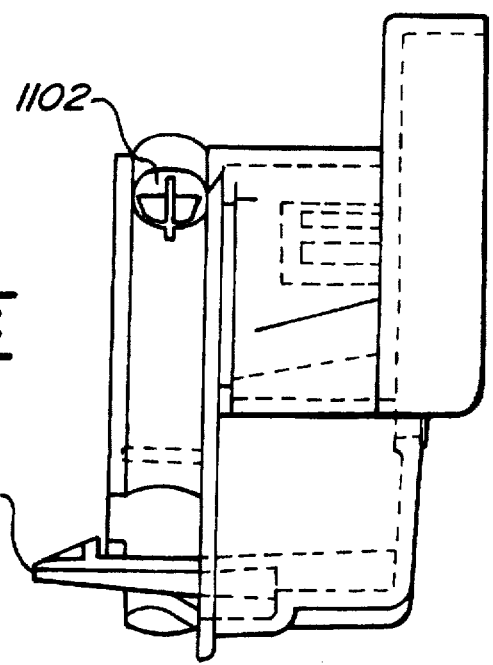
FIG. 11E is a side view of the wind indicator.
Figure 11F:
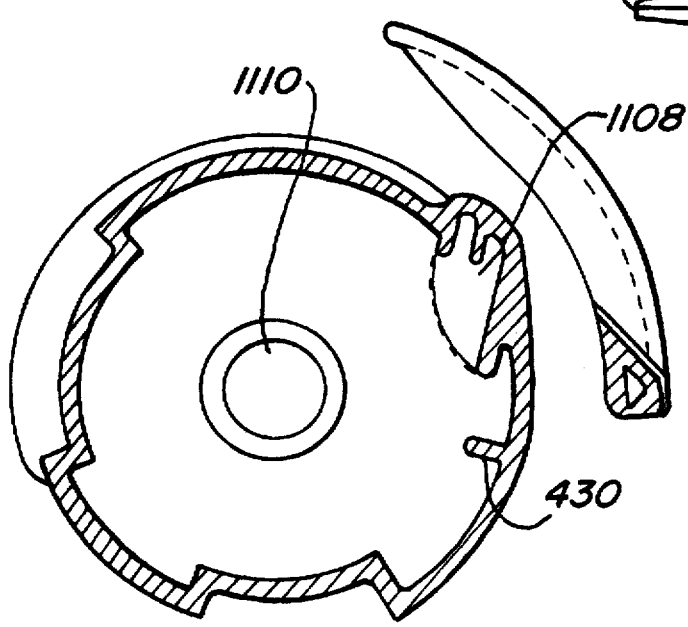
FIG. 11F is a bottom view of the wind indicator.

FIG. 11G shows an additional side view of wind indicator 412 where bias spring 444 is engaged. FIG. 11H shows an additional view of the wind indicator 412. Clearly seen is label surface 432. FIG. 11I is a side view of wind indicator 412 showing spring knob 1102 and curved slot 1104. FIG. 11I shows an additional side view of wind indicator 412 that displays curved slot 1104.

First hanger 414 has a notch for engaging a U-shaped wire that keeps first hanger 414 and a second hanger 602 in synchronization. Wind indicator 412 also includes a central hole that receives a cylindrical projection from first hanger and allows wind indicator 412 to rotate within generally circular portion of first hanger. Wind indicator 412 also includes an interior side having a slot 412 and walls 413 that, as discussed below, receive a torque from mainspring 200 thereby allowing wind indicator to rotate in response to the torque from main spring 200.

Wind indicator 412 further includes an exterior side having a projection for receiving at least one bias spring 444. In the preferred embodiment, the exterior side of the wind indicator includes two round knob shaped projections that have a diameter that is just less than the diameter of two corresponding bias springs so that the projecting portions can be inserted within the coils of the bias springs to fix an end of the bias springs. The knob shaped projections are located such that the force received from the bias springs 444 acts tangentially on wind indicator 412 thereby creating a rotational torque which is opposite to the torque of the main spring 200.

As noted above, back wind stop 408 has projecting portions 430 which engage with corresponding structures 413 within wind indicator 412. See FIG. 11A. Thus, the output torque transmitted from spring sleeve cover 406 into back wind stop 408 is further transferred to wind indicator 412 causing wind indicator 412 to rotate in the same direction as the output torque. However, as noted above, in the preferred embodiment, wind indicator 412 is also engaged with two bias springs 444 that are each mounted between the wind indicator and an inside surface 501 of housing 101. See FIG. 5. The bias springs 414 are positioned such that they will be compressed when wind indicator 412 is rotated by main spring 200. In this way, wind indicator 412 will receive two opposite rotational torques simultaneously. Eventually, wind indicator 412 will reach an equilibrium position. This position will indicate the relative level of torque applied by the main spring 200 because the spring constant of bias springs 444 does not change. The greater the torque stored in main spring 200, the more wind indicator 412 will rotate and the more stored energy will be indicated.

Wind indicator 412 further includes an label surface 432 that can be seen through a slot 504 positioned in housing 101. In the preferred embodiment, label surface 432 is located on a banana shaped structure that is mounted to the exterior surface of the wind indicator 412. See FIG. 11D. The relative position of wind indicator 412 shown by label surface 432 reveals to the operator the approximate amount of torque, in relative terms, stored in main spring 200. Thus, when there is no torque stored in main spring 200, wind indicator 412 will be at a first position as determined by the two bias springs 444. As a maximum torque is applied to main spring 200, that torque will push against bias springs 444 and alter the rotational position of the wind indicator to a second position.

Accordingly, if the indicator is one half the way between the first and second position, then main spring 200 has stored one half of the total amount of the maximum torque. If the number of swing oscillations that can be generated by a fully wound spring is known by the operator, then the torque information supplied by the wind indicator can be used to determine the number of swing oscillations that remain before main spring 200 must be re-wound. The spring constant of the bias spring 444 is chosen to preferably match the range of working torques that may exist in the main spring. Because the wind indicator operates based upon spring torque, many types of main springs can be successfully used in the swing, and the wind indicator will still function properly. This is true even if the various springs have varying numbers of coils or material properties.

Figure 5:
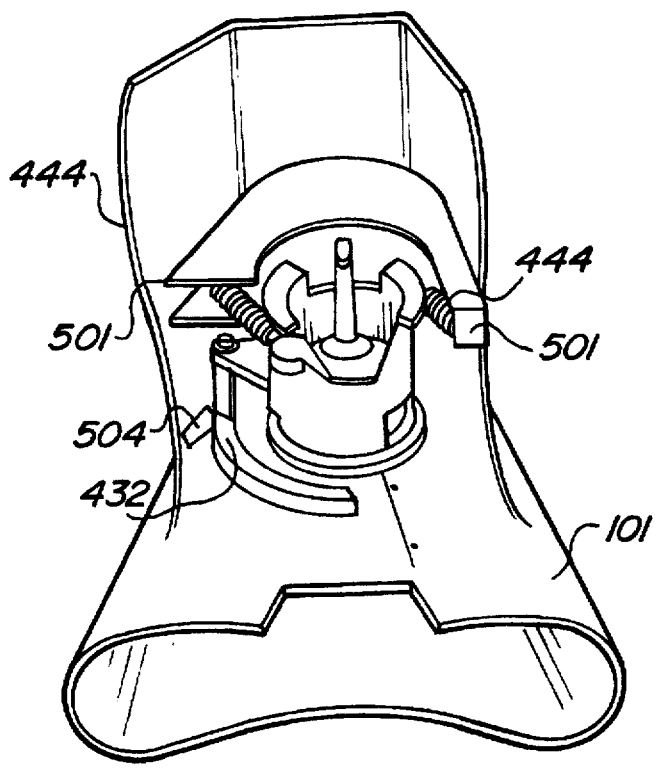
FIG. 5 is a bottom view of the swing housing and the wind end portion of the swing motor mechanism.
Figure 6A:
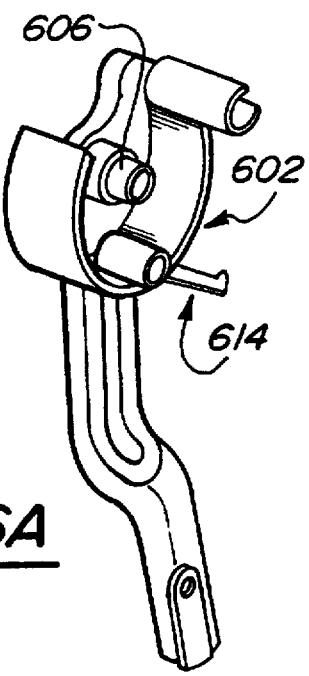
FIG. 6A is a perspective view of the first hanger.
Figure 6B:
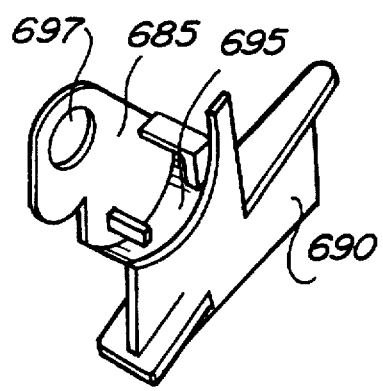
FIG. 6B is a perspective view of the mounting bracket.
Figure 6C:
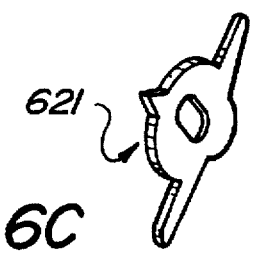
FIG. 6C is a perspective view of the adjusting actuator.

It can be seen from FIG. 5 that the wind indicator mounts within housing 101 such that bias springs 444 are positioned between wind indicator 412 and a portion 501 of housing 101. By knowing the torque on the main spring 200, the operator can then ascertain the relative amount of stored energy that remains in the spring before the spring must be rewound by the handle 102. Wind indicator 412 has the added advantage of being functional even if main spring 200 deforms slightly or changes over time because it measures the amount of torque stored in the spring rather than the number of times the spring has been wound by the operator.

The final component of wind indicator mechanism 400 is first hanger 414. First hanger 414 has a generally circular portion that houses the remaining elements of wind indicator mechanism 400. In addition, first hanger has a lower arm that engages with support arm 108 to lift and suspend child seat 100. First hanger 414 is pivotably mounted to housing 101 such that it can oscillate back and forth when spring drive mechanism 201 is activated. First hanger 414 also includes a notch that receives a U-shaped wire. The U-shaped wire maintains first hanger 414 and second hanger 602 in synchronization during oscillation.

FIGS. 6A-F show the elements of a swing height adjuster 600 which is located at escapement end 204 within second side 114 of housing 101. Swing height adjuster 600 includes a second hanger 602 having a lower arm 604 that engages with support arm 108 to lift and suspend child seat 110. Second hanger 602 is pivotably mounted to housing 101 such that it can oscillate back and forth when acted upon by spring drive mechanism 201. Second hanger 602 supports a dog 614, see FIG. 16A, and also includes a protruding center cylinder 606 that engages with a hole 612 on mounting bracket 610. Mounting bracket 610 supports a pawl 616.

Figure 16A:
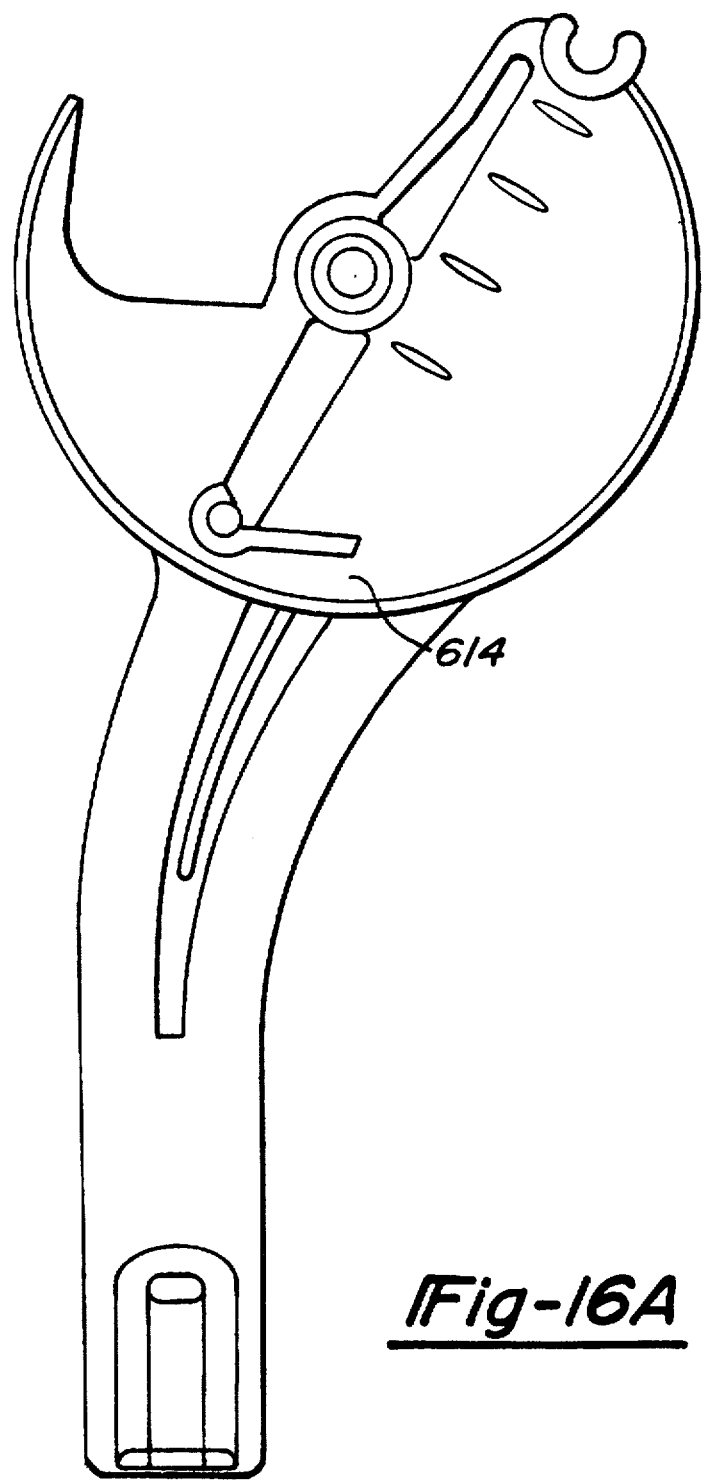
FIG. 16A is a view of the second hanger.
Figure 16B:
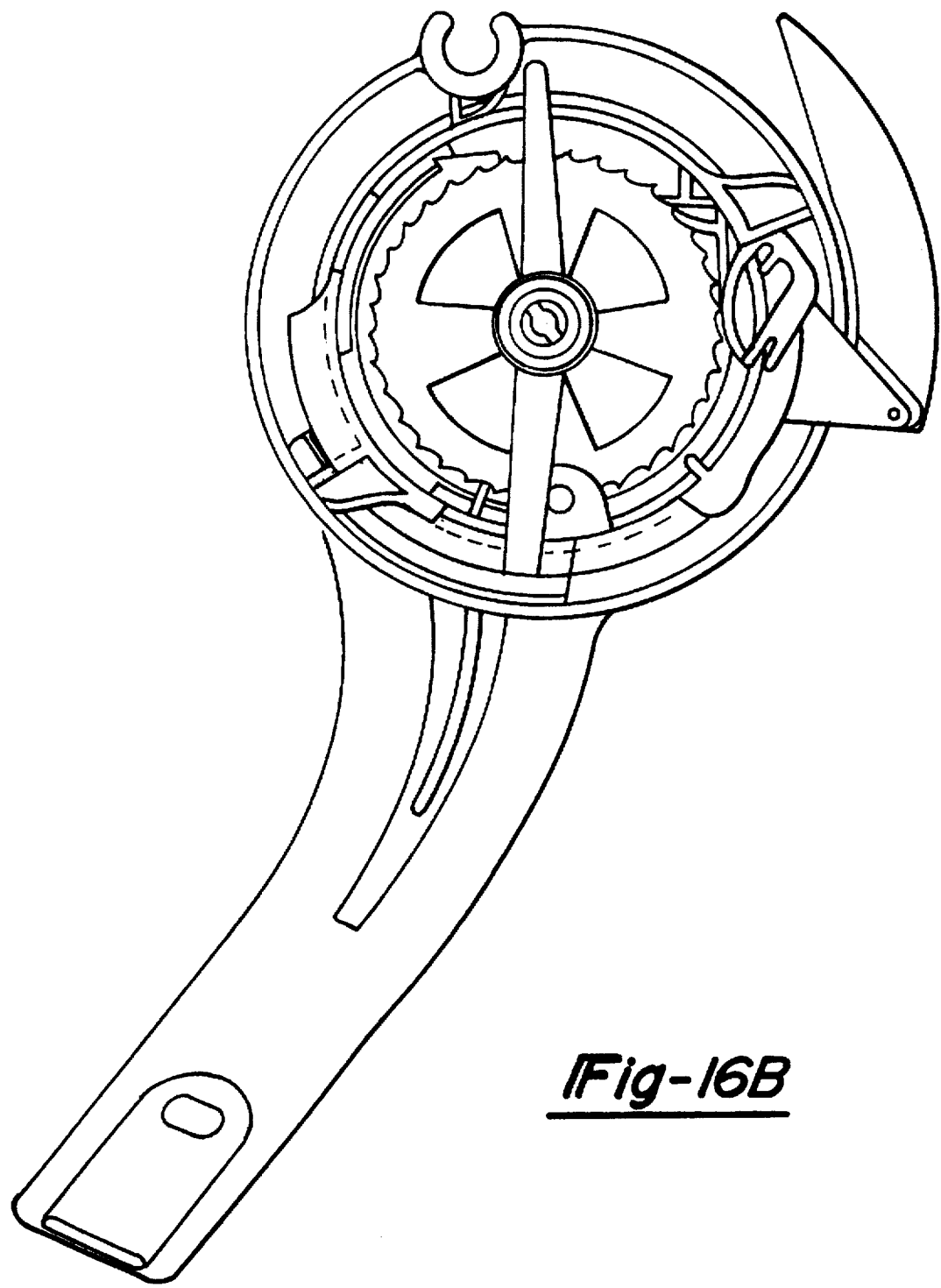
FIG. 16B is an end view of the wind end.
Figure 16C:
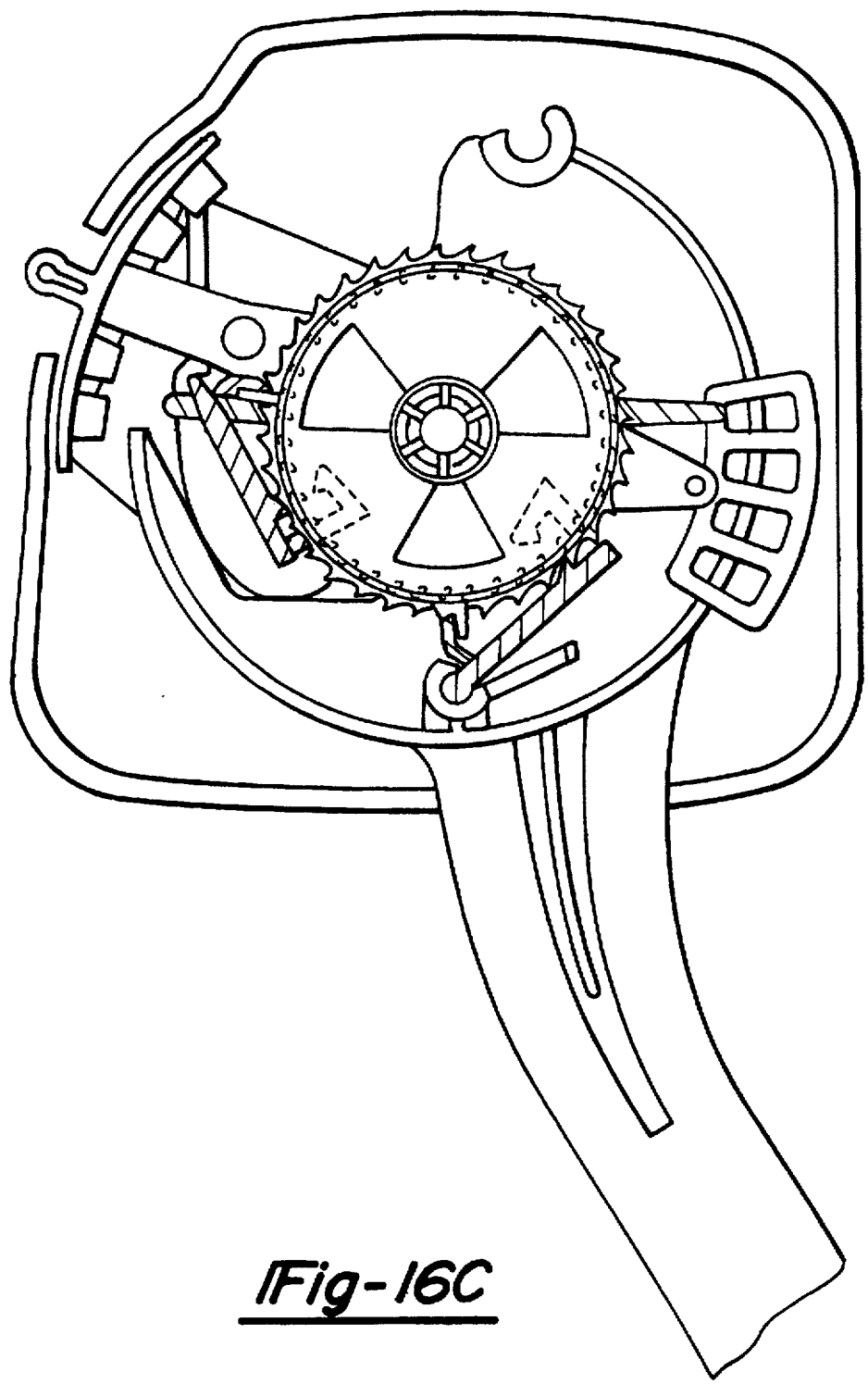
FIG. 16C is an end view of the escapement end.

Dog 614 has a finger 618 and a dog chisel 620. See FIG. 16A. Similarly, pawl 616 has a pawl finger 622 and a chisel 624. FIG. 16A shows a side view of second hanger 602 and indicates the pivotable mounting of the dog 614. FIG. 16B shows a side view of the interior portion of the wind end 202. FIG. 16C shows the interior portion of the escapement end 204.

Figure 17A:
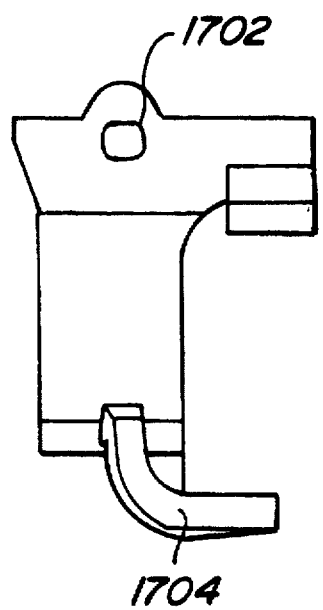
FIG. 17A is a top view of the pawl.
Figure 17B:
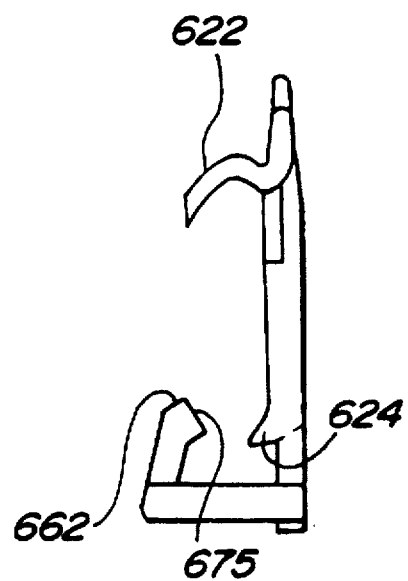
FIG. 17B is a side view of the pawl.

FIGS. 17A and 17B show an enlarged view of pawl 616 including pawl finger 622, pawl chisel 624, and pawl safety 662. Pawl 616 is pivotably jointed to mounting bracket 610 through hole 1702. Safety 662 is located on curved arm 1704 that reaches around ratchet wheel 650 to contact inner teeth 654. FIG. 17B clearly shows that safety 662 is located directly across from chisel 624. Finger 622 is structured and positioned to engage with an actuating member.

Figure 18A:
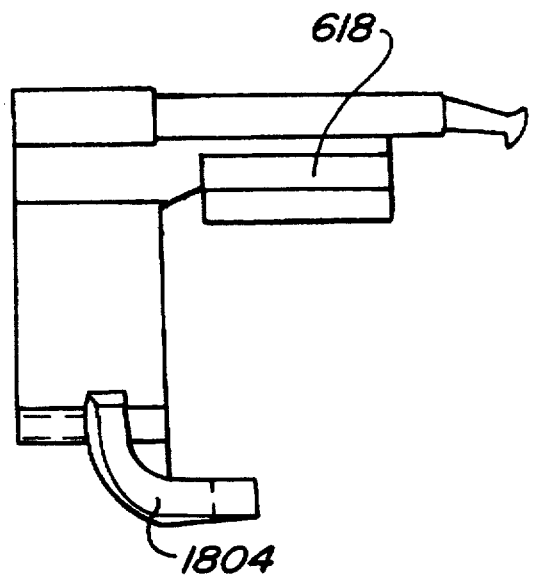
FIG. 18A is a top view of the dog.
Figure 18B:
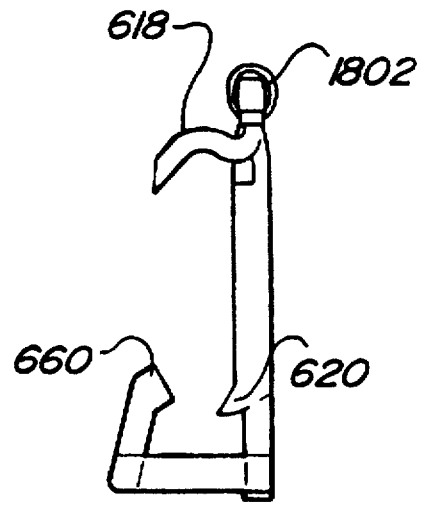
FIG. 18B is a side view of the dog.

FIGS. 18A and 18B show dog 614. Ball end 1802 is engaged with a corresponding structure in first hanger 414 to pivotably mount the dog. Finger 618, as shown in FIG. 18A, is approximately as wide as the width of ratchet wheel 650 to better engage the ratchet gear. Dog arm 1804 is curved to reach around ratchet wheel 650 to allow safety 660 to engage with inner teeth 654 of ratchet wheel 650. The dog and pawl fingers interact with the outer teeth 652 of the ratchet wheel 650, which is connected to main spring 200, to prevent the ratchet wheel 650 from unwinding quickly and to control the release of output torque to oscillate child seat 110. In addition, dog 614 and pawl 616 each have a safety 660 and 662, respectively, that prevent the respective finger portions from bouncing away from ratchet wheel 650 if the wheel should inadvertently begin to unwind rapidly.

Specifically, if ratchet wheel 650 begins to unwind rapidly, chisel 675 will bounce on outer teeth 652 while safety 660 will bounce on inner teeth 654. Because the radial distance 656 between teeth 652 is greater than the distance between point 658 and gully 659, see FIG. 15, either dog chisel 620 or pawl chisel 624 will always remain in contact with a portion of ratchet wheel 650. Thus, either the dog or pawl chisel will eventually bounce into position and lock up ratchet wheel 650 to stop its rapid, uncontrolled rotation.

In addition, dog and pawl safeties 660 and 662 are positioned on opposite sides of ratchet wheel teeth 652 from the dog and pawl fingers respectively along the same radius projecting from the center of ratchet wheel 650 more easily to allow dog finger 618 and pawl finger 622 to grasp ratchet wheel 650. This configuration has the added advantage of compensating for manufacturing differences regarding the thickness of ratchet wheel 650 or in the placement of the dog or pawl rotation points with regard to the ratchet wheel. Accordingly, larger manufacturing tolerances can be advantageously utilized.

Referring again to FIGS. 6A–F, mounting bracket 610 is located adjacent to adjusting actuator 621. Mounting bracket 610 functions to support pawl 616. In the preferred embodiment, mounting bracket 610 includes an insertion portion 685 and an anchoring portion 690. The insertion portion 685 is inserted into second hanger 602 and includes an arched side portion to which pawl 616 is pivotably attached. Insertion portion 685 has a round hole 697 that fits over a center cylindrical 601. The anchoring portion of mounting bracket 610 is secured to housing 101 such that mounting bracket 610 is fixed and does not move relative to second hanger 602. As shall be discussed in more detail below, mounting bracket 610 supports pawl 616 at a distance from the dog on the ratchet wheel that is any number of ratchet teeth away plus one half tooth. Thus, if the ratchet wheel has 36 teeth and each tooth is 10 degrees apart, then the dog and pawl must be located 5, 15, 25, 35, 45, etc. degrees apart.

Figure 12:
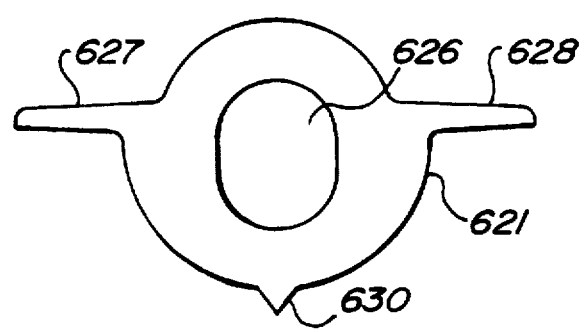
FIG. 12 is a view of the adjusting actuator.

In the preferred embodiment, adjusting actuator 621 is a generally circular structure having a central oblong hole 626, two horizontal arms 627 and 628, and a triangular stop 630. See FIG. 12. Adjusting actuator 621 functions to actuate the dog when the swing is oscillating too high. When the swing is not oscillating too high, the actuator rotates along with the rachet wheel and does not cause actuation. As discussed below, stop 630 of adjusting actuator 621 engages with the dog finger 618 when the swing is oscillating higher than a predetermined amount to actuate the dog prematurely before actuator 640 can do so to prevent main spring 200 from unwinding.

Figure 13:
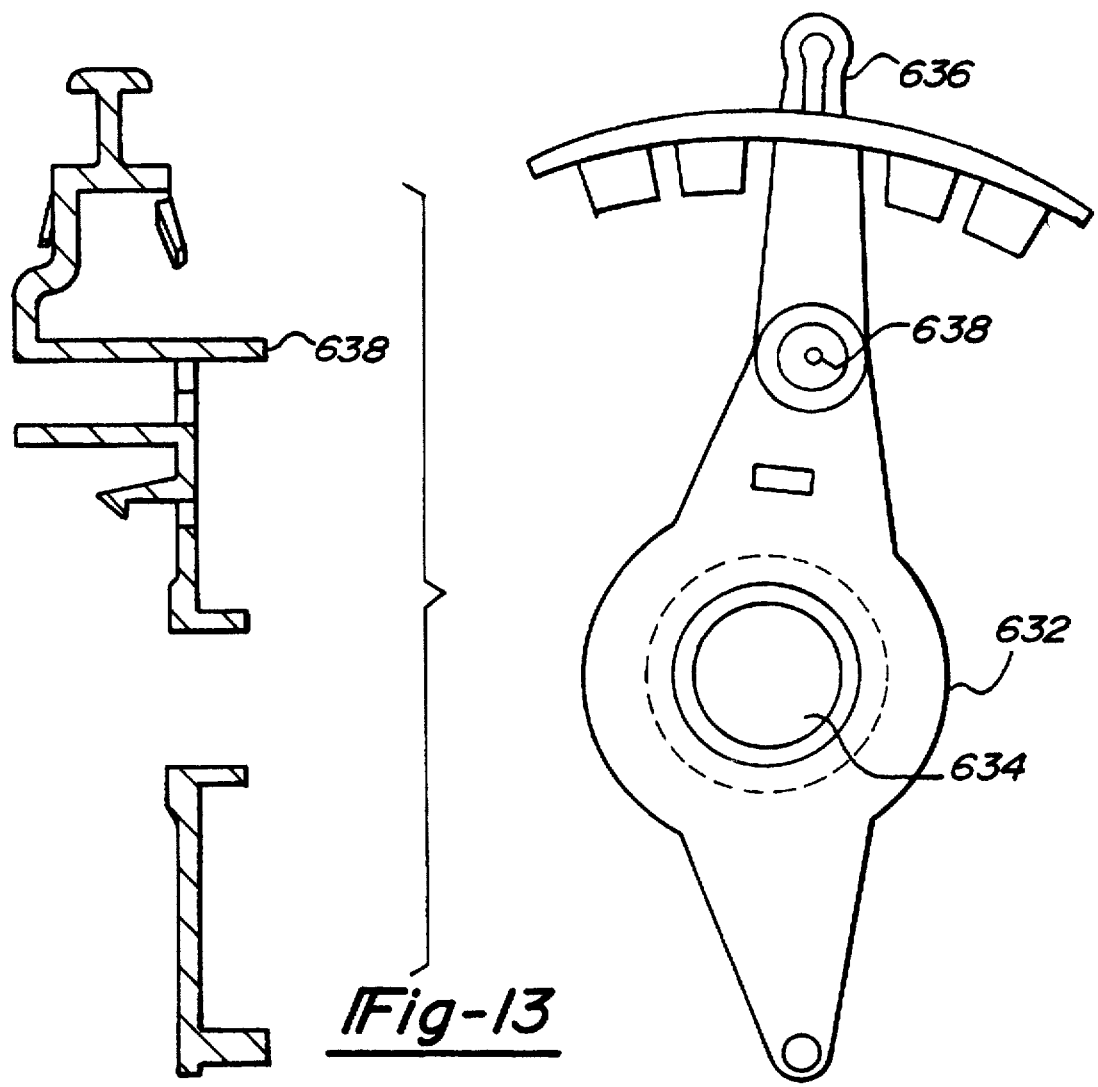
FIG. 13 is a view of the lever.

Mounted adjacent to adjusting actuator 621 is a lever 632 which controls the position of the adjusting actuator 621 thereby controlling the swing height of oscillating child seat 110. See FIG. 13. Lever 632 is pivotably secured through use of a central hole 634 which fits over the cylindrical portion 606 of second hanger 602. Lever 632 includes an adjusting portion 636, which the operator can manipulate, and a fulcrum peg 638 on which adjusting actuator 621 pivots. See FIG. 13. As discussed below, adjusting portion 632 may be manipulated by the operator to rotate fulcrum peg 638 which, in turn, changes the point at which adjusting actuator 621 will pivot.

Figure 14A:
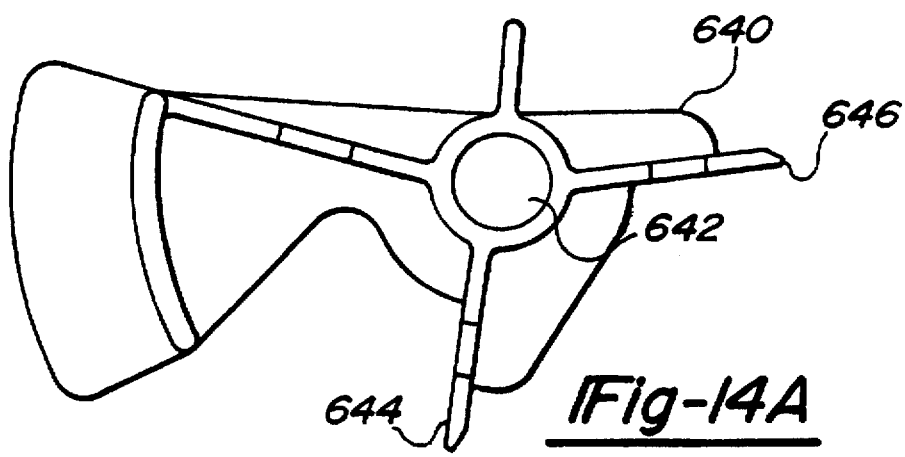
FIG. 14A is a view of the actuator.

Mounted next to lever 632 is actuator 640. See FIG. 14A. FIG. 14B shows actuator 640. Displayed are first finger 644 and second finger 646 having an inclined end for engaging with dog 614 and pawl 616. Indicator 640 also has a counter weight 647 that allows actuator 640 to gravitationally return to the proper position after it is rotationally moved by the operation of the escapement mechanism. Also shown is center hole 642 which allows actuator 640 to be rotationally mounted to the escapement mechanism.

FIG. 14C is a cross-sectional view of actuator 640 showing center hole 642. FIG. 14D shows a side view of actuator 640. Actuator 640 has a central portion 642 which is circular and is mounted on cylindrical portion 606 of second housing 602. Actuator 640 includes a first actuating finger 644 and a second finger 646 which engage with and actuate dog 614 and pawl 616, respectively, to cause dog chisel 620 and pawl chisel 624 to engage and/or release a ratchet wheel tooth 652.

Figure 15D:
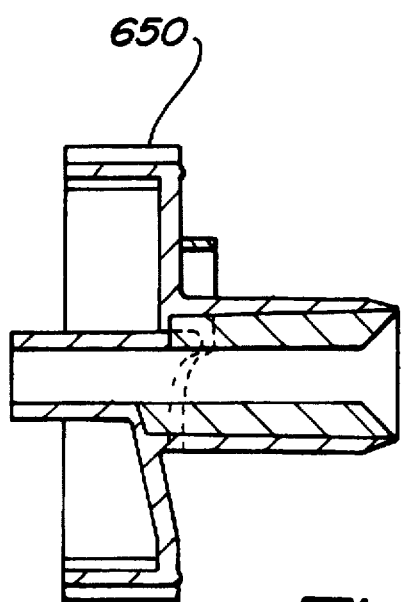
FIG. 15D is a cross-sectional view of the ratchet wheel.
Figure 15D:
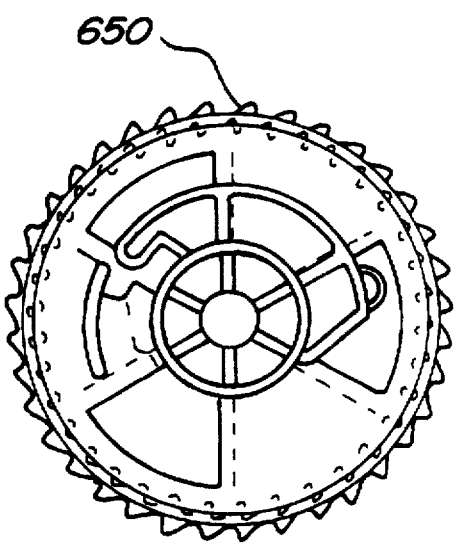
Figure 15E:
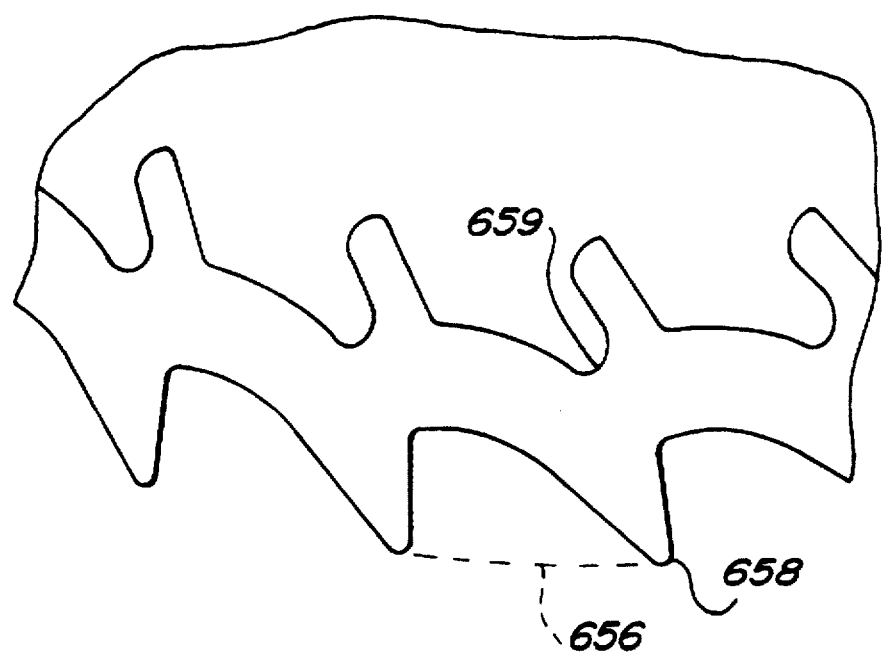
FIG. 15E is an enlarged view of the ratchet wheel.

Mounted next to actuator 640 is ratchet wheel 650. See FIG. 15A-D. FIG. 15D shows an enlarged cross-sectional view of ratchet wheel 650 indicating the structure that permits connection of ratchet wheel 650 with spring 200. FIG. 15E is an enlarged view of a portion of ratchet wheel 650. Indicated is point 658 of outer tooth 652 and gully 659 of inner tooth 654. Also indicated is radial distance 656. Inner teeth 654 may be shaped smaller than outer teeth 652 since the inner teeth do not engage with dog chisel 620 or pawl chisel 624. Rather, as discussed below, inner teeth 654 serve to allow the pawl to bounce when the ratchet is spinning uncontrollably. Ratchet wheel 650 is connected to main spring 200 and has outer shark teeth 652 and inner teeth 654. Ratchet wheel 650 also includes a channel 658 for a rod that can engage with main spring 200. Ratchet wheel 650 has outer teeth 652 and inner teeth 654. As shown in FIG. E, the apex of the outer tooth is referred to as the point while the valley of the inner tooth is referred to as the gully. The distance from one point to the next on adjacent teeth is known as the radial distance. The distance from the point to the corresponding gully is less than the radial distance to decrease the likelihood that the spring would become disengaged and unwind.

It should be further noted that the respective parts of the wind end and escapement end generally snap together so that the entire device can be assembled more simply.

The components of the height adjustment having been described, their operation will now be discussed in detail beginning first with the situation where the swing height does not need adjustment and then discussing the operation of the swing height adjustment feature. In a first stage, the swing is initially drawn back by the operator and then allowed to swing forward into motion in a direction counter to the direction of the stored torque of the main spring. In this first stage, dog 614 is disengaged from ratchet wheel 650 while pawl 616 is engaged and supporting the load of main spring 200. The swing then begins its downward arc. When the swing reaches the appropriate middle of the swing path it reaches a second stage. In the second stage, first actuating arm 644 contacts dog finger 618 causing dog chisel 620 to engage with a tooth 652 of ratchet wheel 650. Meanwhile, second actuating arm 646 falls away from pawl finger 622 allowing pawl chisel 624 to disengage from ratchet wheel 650 by force of gravity. At this point, the load of the spring transfers from the pawl to the dog.

In the third stage, the swing begins its upward motion toward a second apex. The dog is engaged into the ratchet wheel and the spring is, in effect, being wound. The swing then reaches the apex of its forward swing in a fourth stage and begins its return swing, receiving torque as the spring unwinds. During this fourth stage, the dog remains engaged with a tooth 652 of ratchet wheel 650 and bears the load of main spring 200. On the return swing, the process reaches a fifth stage as the device travels through its power stroke. Main spring 200 unwinds a small portion equal to the distance of one tooth further than it was wound in the third stage. (In the preferred embodiment, each tooth covers 10 degrees on the ratchet wheel.)

At a sixth stage, when the swing reaches the vertical position on the return swing, the power stroke ends as the second actuating arm engages pawl finger 622 causing pawl chisel 624 to engage ratchet wheel 650. Meanwhile, first actuating finger 642 moves away from dog finger 618 allowing dog 614 to fall away from ratchet wheel 650 under force of gravity. At this position, the load of main spring 200 is on the pawl. In addition, the dog engages with stop 630 of adjusting actuator 621 causing stop 630 to rotate along with the dog. In the seventh stage, the device reaches the apex of the return swing and begins another forward swing to allow the process to repeat.

On the second forward swing, the device enters the eighth stage. Dog finger 618 engages with first actuating arm 644 causing dog chisel 620 to engage a tooth that is just adjacent to the tooth to which the dog had previously been engaged. Simultaneously, second actuating finger 646 moves away from pawl finger 622 allowing the pawl to disengage from tooth 652. Because dog chisel 620 engages with a tooth 652 that is just adjacent to the tooth to which it was previously engaged, main spring 200 unwinds a small degree. A small portion of the potential energy stored in main spring 200 is thus converted to kinetic energy to drive the swing 100. In this fashion, swing 100 will continue to oscillate until main spring 200 unwinds to the point that the force remaining in main spring 200 can no longer provide sufficient kinetic energy to propel child seat 110. A similar action by the dog 614, pawl 616, and ratchet wheel 650 is generally described in U.S. Pat. No. 4,165,872 to Saint, which is incorporated herein by reference.

Figure 16D:
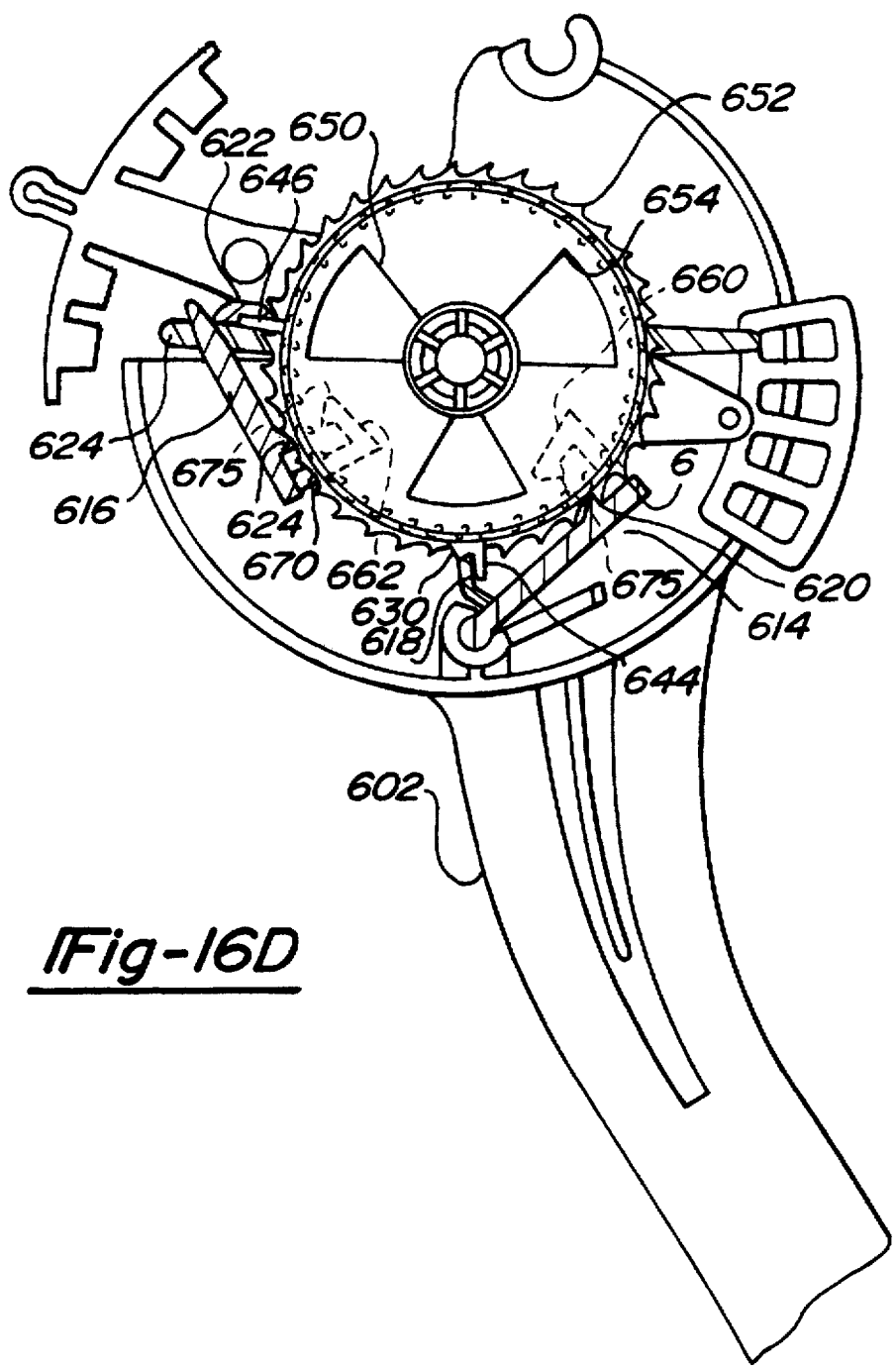
FIG. 16D is an alternate end view of the escapement end.

If child seat 110 oscillates higher than desired, the device can be adjusted by the user to limit the average swing height to a desired level by setting the lever 632 to an appropriate position marked on the housing. See FIG. 16D. FIG. 16A shows a side view of second hanger 602 and indicates the pivotable mounting of the dog 614. FIG. 16B shows a side view of the interior portion of the wind end 202. FIG. 16C shows the interior portion of the escapement end 204. The device preferably operates in substantially the same way as described above until the point in which dog finger 618 strikes stop 630 during its downward power stroke. At that point, stop 630 will rotate with the dog until a maximum swing height is reached. Then, adjusting actuator 621 will pivot upward on a fulcrum peg 639 and dog finger 618 will pass under stop 630 and continue on its upward swing until it reaches its apex. After dog 614 passes under stop 630, adjusting actuator 621 will return by gravitational force back to its original position such that stop 630 returns to a position exactly one tooth away from first actuating arm 644.

On the return swing, dog finger 618 will again encounter stop 630, but this time, stop 630 will not move away from dog 614. Instead, stop 630 will actuate dog finger 618 in a similar way as the first actuator arm did as described above. Specifically, stop 630 will push against dog finger 618 causing dog chisel 620 to engage with a tooth 652. Since stop 630 is one tooth closer to the dog on the return swing than the first actuating arm, dog chisel 620 will not engage with the next consecutive tooth on the ratchet wheel. Rather, it will engage with the same tooth that it had just previously been engaged with.

Because dog 614 does not engage with the next adjacent tooth and rests instead in the same tooth, main spring 200 is prevented from unwinding and does not release any energy to drive ratchet wheel 650 and second hanger 602. Without the energy supplied by the main spring, frictional forces and wind resistance will eventually dampen the swing oscillations, and the motion of the swing will eventually decrease until swing seat 110 can no longer exceed the maximum swing height.

Main spring 200 stores potential energy that has been inputted as kinetic energy during the winding of handle 102. The potential energy is stored in the spring coils which decrease in size, but increase in number. Thus, the amount of energy stored in the spring is related to the number of coils in the spring. The duration of spring unwinding is also related to the number of spring coils since the spring will not continue to operate after the spring is unwound. Moreover, each successive turn of the spring during winding is more difficult to perform than the previous turn. Thus, more torque is applied by the spring, and more energy is released per constant change in rotational distance of the spring during the initial unwinding of the spring, while later spring unwinding applies less torque and releases less.

For this reason, a swing without the swing height adjustor will oscillate higher during initial unwinding because the torque applied and energy released is greater than during later unwinding. By preventing the spring from unwinding when the swing oscillates too high, the excessive energy is not wasted and the energy is at a constant rate. In addition, by preventing the swing from unwinding the duration of the swing is extended.

It will be apparent to those skilled in the art that various modifications and variations can be made in the motor mechanism for a child's swing of the present invention without departing from the spirit or scope of the invention. Thus, it is intended that the present invention cover the modifications and variations of this invention provided they come within the scope of the appended claims and their equivalents.

What is claimed is:

1. In a child swing, an over-wind protection system to prevent the overwinding of a motor mechanism, comprising:

a main spring having an energy storing section and an end section; and a spring sleeve having an opening and an inner surface with the end section of the main spring being disposed adjacent to the inner surface, the end section being compressed and exerting an outward force on the inner surface such that the end section and the spring sleeve are fixedly attached when the main spring applies a torque below a predetermined maximum torque, and such that the end section relatively rotates with respect to the spring sleeve when the predetermined maximum torque is exceeded.

2. The over-wind protection system of claim 1, further comprising:

a spring sleeve grip engaged with the spring sleeve, wherein the main spring engages the spring sleeve grip to prevent axial sliding of the end section with respect to the spring sleeve.

3. The over-wind protection system of claim 2, wherein the spring sleeve grip comprises substantially identical first and second portions.

4. The over-wind protection system of claim 3, wherein the substantially identical first and second portions each include a tab and a slot, wherein the tab on the first portion engages the slot in the second portion and wherein the tab on the second portion engages the slot in the first portion.

5. The over-wind protection system of claim 1, wherein the end portion of the main spring has a plurality of coils having substantially equal diameters, the plurality of coils engaging the inner surface of the spring sleeve and having an axial length, and the inner surface of the spring sleeve having an axial length substantially similar to the axial length of the plurality of coils.

6. The over-wind protection system of claim 1, wherein the main spring has a bent end wire portion that contacts a projecting portion producing a sound.

7. The over-wind protection system of claim 1, wherein the spring sleeve has a first end and a second end, the first end adapted to receive the main spring, and the second end having an edge and a plurality of teeth disposed on the edge.

8. The over-wind protection system of claim 1, wherein the spring sleeve includes an interior entry lip disposed adjacent an end of the spring sleeve to prevent a plurality of coils from sliding out.

9. The over-wind protection system of claim 1, wherein the main spring includes a neck section having a smaller outer diameter than all outer diameter of the end section of the main spring.

10. The over-wind protection system of claim 2, wherein the spring sleeve grip includes a groove disposed on an interior side and adapted to engage an outer lip disposed on an end of the spring sleeve.

11. In a child swing, a winding mechanism comprising:

a spring sleeve having an opening and an inner surface;

a spring sleeve grip engaged with the spring sleeve; and a main spring having a central energy storage region, a first end, and a second end, the first end having an outer surface, the first end of the main spring is inserted into the spring sleeve such that the outer surface of the first end contacts the inner surface of the spring sleeve, the main spring further having a neck portion disposed axially between the first end and the central energy storage region, wherein the neck portion engages the spring sleeve grip to prevent axial sliding of the first end with respect to the spring sleeve.

12. The winding mechanism of claim 11, wherein the spring sleeve has a first axial end and a second axial end, the first axial end adapted to receive the main spring, and the second axial end having an edge and a plurality of teeth disposed on the edge.

13. The winding mechanism of claim 11, wherein the spring sleeve includes an interior entry lip disposed adjacent to an axial end of the spring sleeve to prevent a plurality of coils from sliding out.

14. The winding mechanism of claim 11, wherein the spring sleeve grip comprises two substantially identical portions.

15. The winding mechanism of claim 11, wherein the spring sleeve grip comprises two substantially identical first and second portions, the portions each having a tab and a slot, wherein the tab in the first portion engages the slot on the second portion and wherein the tab on the second portion engages the slot on the first portion.

16. The winding mechanism of claim 11, wherein the spring sleeve grip has a groove disposed on an interior side and adapted to engage an outer lip disposed on an axial end of the spring sleeve.

17. The winding mechanism of claim 11, wherein the first end of the main spring has a plurality of coils having substantially equal diameters, the plurality of coils engaging the inner surface of the spring sleeve and having an axial length, and the inner surface of the spring sleeve having an axial length substantially similar to the axial length of the plurality of coils.

18. The winding mechanism of claim 11, wherein the main spring has a bent end wire portion that contacts a projecting portion producing a sound.

19. The winding mechanism of claim 11, wherein the neck portion of the spring has a smaller outer diameter than an outer diameter of the first end of the spring.

* * * * *